(12) United States Patent
Shpalensky et al.

(10) Patent No.: US 11,734,798 B2
(45) Date of Patent: *Aug. 22, 2023

(54) METHOD AND APPARATUS FOR PERSON SUPER RESOLUTION FROM LOW RESOLUTION IMAGE

(71) Applicant: Intel Corporation, Santa Clara, CA (US)

(72) Inventors: Yuri Shpalensky, Givataim (IL); Tzach Ashkenazi, Petach Tikva (IL); Maria Bortman, Askelon (IL); Roland Mishaev, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/321,911

(22) Filed: May 17, 2021

(65) Prior Publication Data
US 2021/0272239 A1 Sep. 2, 2021

Related U.S. Application Data

(63) Continuation of application No. 16/397,941, filed on Apr. 29, 2019, now Pat. No. 11,010,872.

(51) Int. Cl.
*G06T 3/40* (2006.01)
*G06T 7/70* (2017.01)
(Continued)

(52) U.S. Cl.
CPC .......... *G06T 3/4053* (2013.01); *G06T 3/4046* (2013.01); *G06T 3/4076* (2013.01);
(Continued)

(58) Field of Classification Search
CPC ....... G06T 3/4076; G06T 7/70; G06T 3/4046; G06T 3/4053; G06T 5/50;
(Continued)

(56) References Cited

U.S. PATENT DOCUMENTS 8,878,950 B2 * 11/2014 Lelescu .................. G06T 5/001
348/218.1
9,836,819 B1 12/2017 Donsbach et al.
(Continued)

FOREIGN PATENT DOCUMENTS

CN 108765279 A * 11/2018
CN 109064399 A * 12/2018 ........... G06N 3/0454

OTHER PUBLICATIONS

Extended European Search Report for EP Patent Application No. 20166878.7, dated Sep. 25, 2020.
(Continued)

*Primary Examiner* — Ian L Lemieux
(74) *Attorney, Agent, or Firm* — Essential Patents Group, LLP

(57) ABSTRACT

Techniques related to generating a fine super resolution image from a low resolution image including a person wearing a predetermined uniform are discussed. Such techniques include applying a pretrained convolutional neural network to a stacked image including image channels from a coarse super resolution image, label data corresponding to the coarse super resolution image from available labels relevant to the uniform, and pose data corresponding to the person to determine the fine super resolution image.

20 Claims, 10 Drawing Sheets

(51) Int. Cl.
*G06T 5/50* (2006.01)
*G06V 40/10* (2022.01)
*H04N 23/90* (2023.01)
*G06V 10/764* (2022.01)
*G06V 10/82* (2022.01)
*G06F 18/214* (2023.01)

(52) U.S. Cl.
CPC .......... *G06T 5/50* (2013.01); *G06T 7/70* (2017.01); *G06V 10/764* (2022.01); *G06V 10/82* (2022.01); *G06V 40/103* (2022.01); *H04N 23/90* (2023.01); *G06F 18/214* (2023.01); *G06T 2207/20081* (2013.01); *G06T 2207/20084* (2013.01); *G06T 2207/20221* (2013.01); *G06T 2207/30196* (2013.01); *G06T 2207/30221* (2013.01)

(58) Field of Classification Search
CPC . G06T 2207/20081; G06T 2207/20084; G06T 2207/20221; G06T 2207/30196; G06T 2207/30221; G06V 40/103; H04N 5/247; G06K 9/6256
See application file for complete search history.

(56) References Cited

U.S. PATENT DOCUMENTS

| | | | |
|---|---|---|---|
| 10,586,344 | B2 | 3/2020 | Qi |
| 11,270,476 | B2* | 3/2022 | Chen .................. G06T 3/0093 |
| 2015/0363634 | A1 | 12/2015 | Yin et al. |
| 2017/0256033 | A1 | 9/2017 | Tuzel et al. |
| 2019/0259170 | A1 | 8/2019 | Qi |
| 2019/0304063 | A1 | 10/2019 | Cansizoglu |
| 2019/0304076 | A1 | 10/2019 | Nina Paravecino et al. |
| 2021/0241500 | A1* | 8/2021 | Chen .................. G06N 20/00 |

OTHER PUBLICATIONS

Non-Final Office Action for U.S. Appl. No. 16/397,941, dated Aug. 25, 2020.

Notice of Allowance for U.S. Appl. No. 16/397,941, dated Feb. 3, 2021.

Chao, L. et al., "Image super-resolution based on segmentation and classification with sparsity", 2016 2nd IEEE International Conference on Computer and Communications (ICCC), Oct. 14, 2016.

Chen, et al., "FSRNet: End-to-End Learning Face Super-Resolution with Facial Priors", Proceedings of the IEEE Conference on Computer vision and Pattern Recognition, 2018.

Fabbri, M. et al., "Generative Adversarial Models for People Attribute Recognition in Surveillance", Cornell University Library, Jul. 7, 2017.

Guler, et al., "Dense-pose: Dense human pose estimation in the wild", arXiv preprin arXiv:1802.00434, 2018.

* cited by examiner

METHOD AND APPARATUS FOR PERSON SUPER RESOLUTION FROM LOW RESOLUTION IMAGE

CLAIM FOR PRIORITY

This application is a Continuation of and claims priority to U.S. patent application Ser. No. 16/397,941, filed on Apr. 29, 2019, and titled "METHOD AND APPARATUS FOR PERSON SUPER RESOLUTION FROM LOW RESOLUTION IMAGE", which is incorporated by reference in its entirety for all purposes.

BACKGROUND

In various contexts, low resolution images of people are attained of people in a scene due to one or more cameras trained on the scene being far from the people. For example, sporting events or other activities may use multiple cameras installed throughout a venue to attain videos or images of the scene. The video may be used to build a volumetric model of the scene to provide an immersive user experience including virtual images from any point in the scene. Even at high resolution (e.g., 5K resolution), since the cameras may be far from the people in the scene (e.g., athletes), the person in the image may be attained at low resolution such as an image portion of about 160 pixels in height. Therefore, the people in the scene are small in the constructed point cloud, which translates to low resolution in the projected virtual images.

It may be advantageous to improve the resolution of low resolution images of people to super resolution images such that, for example, virtual views of a scene are improved for enhanced user experience. It is with respect to these and other considerations that the present improvements have been needed. Such improvements may become critical as the desire to provide immersive user experiences in scenes attained by multiple cameras such as professional sporting events becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
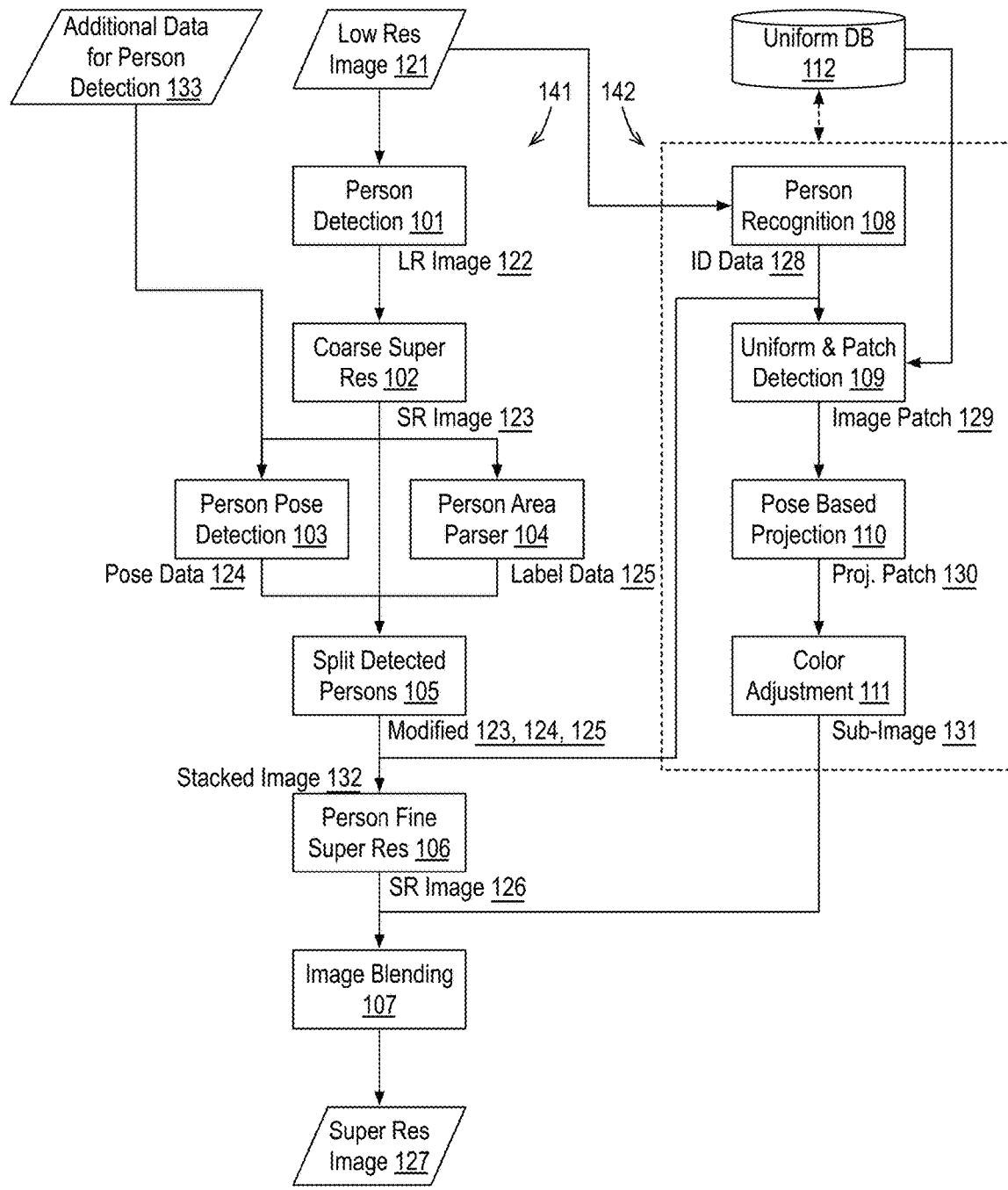
FIG. 1 illustrates an example apparatus for generating a super resolution image of a person wearing a predetermined uniform.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating a super resolution image of a person from a low resolution image of the person and, optionally, other predefined image information corresponding to the person.

As described above, it may be advantageous to improve the resolution of low resolution images of people to super resolution images such that, for example, virtual views of a scene are improved for enhanced user experience. For example, to provide an immersive experience for viewing content created by multiple cameras or arrays of cameras, high quality and efficiently generated virtual views for positions between camera positions are needed. To generate views from cameras and/or such views from virtual positions, it is advantageous to have high quality, high resolution images of people from the scene.

In some embodiments, multiple cameras are installed around a scene where people wearing predefined uniforms are to participate in an event. For example, multiple cameras maybe installed around a sports stadium to build volumetric model of the scene in the stadium for offering immersive user experience. As used herein, the term camera indicates any device that attains image data of a scene. Low resolution images and/or other image data processed using the techniques discussed herein may be generated using such cameras locally or it may be attained from remote cameras, other remote devices, local memory, etc. The term predetermined uniform as used herein indicates clothing or other items worn by people such that they are also pre-known to be worn by the person during participation in the pertinent event. The predetermined uniform may be known at any level of detail. In some embodiments, the predetermined uniform is generic in the sense that it is known only that the person will be wearing clothing in general. In other embodiments, the predetermined uniform may be known at any higher level of detail (i.e., that the uniform will be a uniform for a particular sport, that the uniform will be a uniform for a particular team, and so on). For example, in the context of sports, the uniforms of each team and player are predetermined prior to the sporting event. Similarly, in the context of a play or concert, the uniform of each performer is predetermined prior to the event. As discussed herein, the predetermination of such uniforms (including shirts, pant, shorts, hats, helmets, gloves, shoes, etc.) may be used in pre-training convolutional neural networks (CNNs) and/or in storing image patches of parts of the uniform. For example, an image patch of a word or patch from a sports uniform, a highly textured patch of a uniform (e.g., a seam, hem, portion surrounding a neck or arms, etc.), or the like may be stored for use and insertion into a super resolution as is discussed further herein. As used herein, the term CNN indicates a pretrained deep learning neural network including an input layer, multiple hidden layers, and an output layer such that the hidden layers include one or more of convolutional layers each include at least a convolutional layer (and optionally include, for example, a RELU layer, a pooling layer, and a normalization layer). The CNN also may also include a fully connected layer.

As discussed, although the cameras surrounding a scene (e.g., fixed 5K resolution cameras) may necessarily need to be placed relatively far from at least portions of the scene due to the size of the scene, the inability to place it closer due to obstruction of the scene (both obstruction of the participants and of live viewers), and so on. As a result, images of persons in the scene may be low resolution such as 160 pixel images. As used herein, the term low resolution indicates an image, relative to another image or to an accepted image standard, has a low pixel density. For example, a low resolution image has a lower pixel density for the same image subject matter as a high resolution image or super resolution image. Such low and high or super image resolutions may be any suitable image resolutions. In some embodiments, a high or super resolution has four times the pixel density in both the horizontal and vertical dimensions. However, any relative pixel resolutions may be implemented.

The techniques discussed herein include creating a coarse super resolution image for an image including an entirety of a person, detecting body pose and person parsing from the coarse super resolution image, and creating a fine super resolution image by utilizing both the coarse estimation and pose data. As used herein the terms coarse super resolution image and fine super resolution image indicate images at a higher resolution than an input low resolution image at the same resolution (and a higher resolution than an input low resolution image) with the fine super resolution image being refined with respect to the coarse super resolution image to provide improved objective and subjective image quality. In some embodiments, the coarse and fine super resolution images have the same resolution. In some embodiments, the fine super resolution image has a greater resolution than the coarse super resolution image. Notably, the coarse super resolution image may be used as a base or input image for generation of the fine super resolution image. For example, a pretrained CNN may be applied to image channels attained from the coarse super resolution image, image channels from label or parsing data detected from the coarse super resolution image, and image channels from body pose information also detected from the coarse super resolution image. Notably, the pretrained CNN may be pretrained along with other CNNs on training data pertinent to the scene, person, and uniform pertinent to the input image. Such super resolution images may be further merged with previously stored image patches also pertinent to the scene, person, and uniform of the input image to generate a final super resolution image for presentment to a viewer. Such fine super resolution images, with or without such further image patch processing, provide high quality, high resolution images for enhanced viewer experience. Such presentment may include presenting the image to a viewer, transmitting the image for presentment to a viewer at another device, storing the image for later presentment, etc. or performing any of the same actions for a virtual view image attained using the super resolution image. Furthermore, as discussed herein, fine super resolution image results may be improved using more specific models (i.e., CNNs) for the particular event. For example, models trained using pre-trained data for a particular sports team will perform better than a model trained using pre-trained data for any sports team of the sport generally. The techniques discussed herein, in contrast to the general super resolution techniques, utilize prior knowledge of human pose and form, as well as prior knowledge of predetermined uniform configuration to improve super resolution of person images.

In some embodiments, a low resolution image that includes an entirety of at least one person wearing a predetermined uniform is received. As used herein, the term entirety of a person indicates no portion of the person extends outside the frame of the image but it does not indicate that every portion (or even front, back, or side portions) of the person is within view of the frame. Although discussed herein, in some embodiments, with respect to images that include an entirety of a person, in some embodiments, the techniques are applied to images having a majority of a person such that one or more body parts (typically unimportant body parts) are outside of the frame. A first super resolution image is generated using the low resolution image such that the first super resolution image has a greater resolution (i.e., pixel density) than the low resolution image. The first super resolution image may also be characterized as a coarse super resolution image.

A first pretrained convolutional neural network is applied to the first super resolution image to associate particular labels from a predetermined set of labels to pixels of the first super resolution image such that the predetermined set of labels include at least a set of labels each corresponding to the predetermined uniform. For example, the first pretrained CNN is pretrained based on labels that include labels pertinent to regions of the predetermined uniform such as one or more or combinations of shirt, pants, shorts, socks, shoes, helmet, front number patch, team shirt patch, shorts patch, etc. The first pretrained CNN may also be pretrained based on labels that are pertinent to regions of the person that are not part of the uniform but are exposed when the uniform is worn such as one or more or combinations of leg, hand, face, torso, etc. The image generated by applying the first pretrained convolutional neural network may include pixel-wise label information such that each pixel indicates a most likely label for the pixel (or no label).

Pose information corresponding to the person is determined from the first super resolution image using any suitable technique or techniques such as dense key point models, application of another pretrained CNN, etc. Multiple image channels from the first super resolution image, the label or parsing information, and the pose information are then concatenated to generate a stacked image such that the stacked image may include, for example, each color channel of the first super resolution image, a binary image for each of the set of labels (e.g., an image indicating a one for a pixel where the label is detected and a zero for other pixels), and binary or probability maps for each body part and/or connection detected in the pose information.

The stacked image is provided to a pretrained CNN to generate a fine super resolution image. Notably, the pretrained CNN was trained using training images (labeled with ground truth information) pertinent to the predetermined uniform, expected poses of detected persons, etc. The fine super resolution image is then presented to a viewer or further processed for presentment to a viewer. In addition, an identify or a particular feature of the person is detected using the low resolution image or the first super resolution image, a predetermined image patch is attained from memory using the identify or particular feature of the at least one person, a sub-image is generated from the predefined image patch, and the fine super resolution image and the sub-image are merged to generate a final super resolution image. In some embodiments, generating the sub-image includes projecting the predefined image patch to an image plane defined by relative positions of a camera used to attain the low resolution image and the person to generate a projected image patch, concatenating image channels of the first super resolution image, the channels corresponding to the binary image of the labels, and the projected image patch to generate another stacked image, and a pretrained convolutional neural network is applied to the stacked image to generate the sub-image.

FIG. 1 illustrates an example apparatus 100 for generating a super resolution image of a person wearing a predetermined uniform, arranged in accordance with at least some implementations of the present disclosure. Although discussed herein with respect to a predetermined uniform, which may be known at any level of detail, such a uniform may be generally termed as clothing worn by a person. For example, the discussed techniques may be utilized even without specific details of the predetermined uniform. As shown in FIG. 1, apparatus 100 includes a person detection module 101, a coarse super resolution module 102, a person pose detection module 103, a person area parser 104, a split detected persons module 105, a person fine super resolution module 106, and an image blending module 107 implemented as part of a predetermined uniformed person super resolution pipeline 141. Apparatus 100 may also include a person recognition module 108, a uniform and patch detection module 109, a pose based projection module 110, and color adjustment module 111 implemented as part of a predetermined uniform knowledge insertion module 142. Apparatus 100 may be implemented in any suitable device or grouping of devices. In some embodiments, apparatus 100 is implemented via a server computer, a cloud computing environment, personal computer, a laptop computer, a tablet, a phablet, a smart phone, a gaming console, a wearable device, a display device, an all-in-one device, a two-in-one device, or the like. In some embodiments, apparatus 100 is implemented via a combination of such devices. In particular, apparatus 100 may be implemented among several devices for the sake of improved performance such as computational speed. For example, apparatus 100 may perform image super resolution as discussed herein. In some embodiments, apparatus 100 may include or be implemented with multiple cameras used to attain images of the scene. Furthermore, such views may be used to generate build a volumetric model such as a point cloud or similar data structure of the scene. For example, the components of apparatus 100 may be incorporated into any multi-camera multi-processor system to deliver immersive visual experiences for viewers of a scene.

As shown, apparatus 100 generates or attains a low resolution image 121. Low resolution image 121 may include any suitable image data, picture data, video frame data, or the like or any data structure representative of a picture at any suitable resolution. In an embodiment, low resolution image 121 includes RGB image data each having R (red), G (green), and B (blue), values for pixels thereof. In an embodiment, low resolution image 121 is a picture of a sequence of video pictures. In an embodiment, low resolution image 121 has a 5 k resolution (e.g., a horizontal resolution of around 5,000 pixels such as 5120×3072 pixel resolution). In some embodiments, low resolution image 121 has a resolution of not less than 4 k (e.g., a horizontal resolution of around 4,000 pixels and not less than 3840 pixels such as such as 3840×2160 pixel resolution or 4096× 2160 pixel resolution). Furthermore, apparatus 100 attains additional data for person detection 133, which may include any suitable data or data structures pertinent to person detection such as point cloud data of the scene relevant to low resolution image 121, additional image(s) of the scene relevant to low resolution image 121 (e.g., images from other camera views as that of low resolution image 121), or other data. For example, additional data for person detection 133 may be generated on another device and transmitted to apparatus 100.

Figure 2:
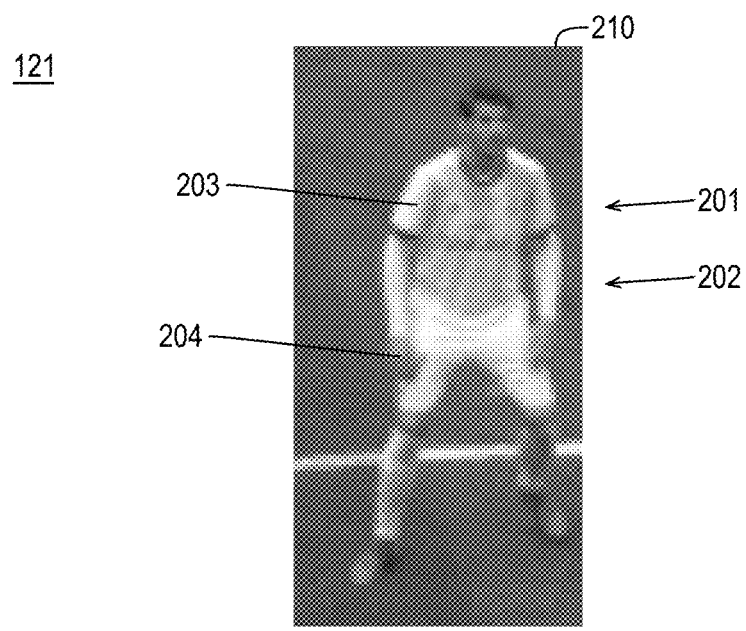
FIG. 2 illustrates an example portion of an example low resolution image including a person.

FIG. 2 illustrates an example portion 210 of an example low resolution image 121 including a person, arranged in accordance with at least some implementations of the present disclosure. As shown in FIG. 2, low resolution image 121 may be attained from any suitable scene (in this example, a sporting event, namely soccer, scene) such that a person 201 or persons in the scene are wearing predetermined uniforms such as predetermined uniform 202. As discussed, predetermined uniform 202 indicates clothing or other items worn by person 201 such that predetermined uniform 202 is pre-known to be worn by the person during participation an event corresponding to low resolution image 121. It is noted that such pre-knowledge of predetermined uniform 202 may be at any level of granularity. For example, predetermined uniform 202 may correspond to any person (e.g., any field player in the soccer example), to a particular person (e.g., only player number 25), to a known subset of persons (e.g., all field players wearing long sleeve jerseys), and so on. Notably, predetermined uniform 202 may correspond to all persons in a scene, to a subset of persons in the scene, or to only one person of the scene. In the illustrated example, predetermined uniform 202 includes uniform elements as indicated by uniform element 203 (e.g., a shirt) that may include shirts, shorts, pants, gloves, shoes, socks, hats, helmets, word marks on a top jersey, a hem pattern, a shorts patch, a jersey front patch, a name on a back of a jersey, and so on. Notably, predetermined uniform 202 may be broken down into any number of predefined uniform elements such as uniform element 203. As discussed, predetermined uniform 202 may also be generic in that it is only known that the person will be wearing clothing. For example, the discussed techniques, including parse maps generation may be performed even when specifics of a predetermined uniform 202 are not known. Furthermore, person 201 may also include other portions that are not part of predetermined uniform 202 but are uniform in the sense that they are expected to be exposed when person 201 wears predetermined uniform 202. For example, exposed regions such as exposed hand 204, an exposed face and head, exposed legs, exposed torsos, etc. are predetermined when person 201 wears predetermined uniform 202.

As is discussed further herein, such uniform elements and uniformly exposed body elements may be labeled as part of an image parsing or image labeling operation. Such image parsing or image labeling may be performed by a CNN pretrained on the same (or heavily overlapping) uniform elements and uniformly exposed body elements such that pixels of portion 210 or a super resolution image corresponding to portion 210 are labeled with a label corresponding to one of the uniform elements and uniformly exposed body elements (or no label).

Returning to FIG. 1, low resolution image 121 (and optionally additional data for person detection 133) is received by person detection module 101. Person detection module 101 detects one or more persons in low resolution image 121 and provides one or more corresponding low resolution images 122 that are cropped to include an entirety or a majority of one or more persons. Notably, for low resolution images 122 having multiple persons, split detected persons module 105 may split such persons. In the illustration of FIG. 1, processing for a single low resolution image 122 having one or more persons with predetermined uniforms is illustrated. However, any number of such low resolution images 122 may be processed either in serial or at least partially in parallel.

Person detection module 101 may detect such persons using any suitable technique or techniques. In an embodiment, person detection module 101 implements a pedestrian detection algorithm such as a CNN based pedestrian detection algorithm. In an embodiment, since the scene may include a uniform background color (such as a soccer field of green or a play being performed on a black stage and in front of a black background) and persons of a relatively consistent size, person detection module 101 may detect foreground objects with a relevant size and perform person detection by background subtraction.

Figure 3:
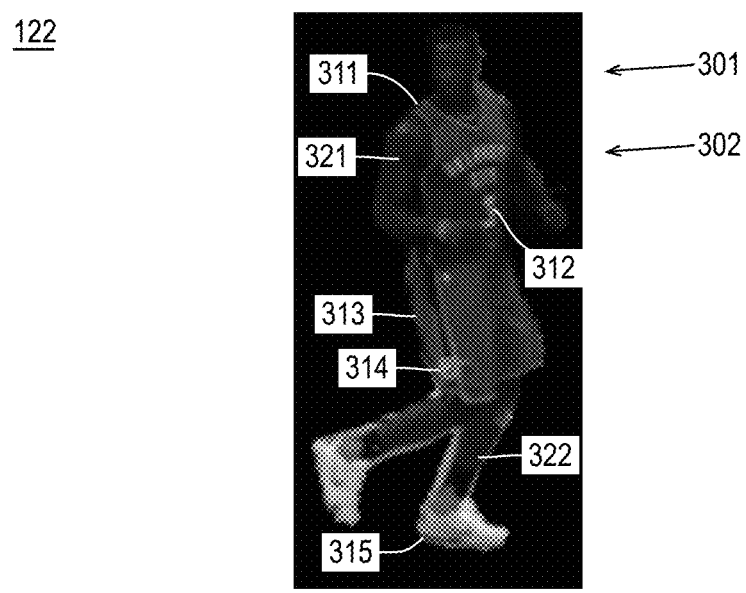
FIG. 3 illustrates an example low resolution image including a person wearing a predetermined uniform.

FIG. 3 illustrates an example low resolution image 122 including a person wearing a predetermined uniform, arranged in accordance with at least some implementations of the present disclosure. As discussed, although illustrated with respect to a predetermined uniform, in some embodiments, the uniform or uniform specifics may be unknown. For example, in low resolution image 122, the image uniform or uniform specifics may be unknown, there may be ground truth marks for parts only (e.g., number jersey, etc.) during training, etc. For example, such components may be generic and do not necessarily indicate the uniform is predetermined at the specificity shown (e.g., the team, sport, etc. may not be known as part of the predetermined uniform). As shown in FIG. 3, low resolution image 122 includes pixels representative of a person 301 with other pixel values indicating a background (e.g., zero pixel values). Furthermore, person 301 is wearing a predetermined uniform 302 (e.g., known prior to image capture) having predetermined uniform elements. In this example, person 301 is a basketball player wearing a predetermined basketball uniform.

Predetermined uniform 302 includes predetermined uniform elements such as a top jersey 311, a front uniform number 312, shorts 313, a shorts patch 314, and shoes 315. Notably, the predetermined uniform elements may also include, for example, a front top jersey word mark, a top jersey piping, a shorts piping, a shoes logo, and so on, at any level of granularity. Furthermore, person 301 may also include other portions that are not part of predetermined uniform 302 but are uniform in that they are expected to be exposed. For example, exposed regions such as exposed arm 321, exposed leg 322 are also evident in low resolution image 122. Notably, such uniformly exposed elements may also be evaluated at any level of granularity. For example, uniformly exposed elements may include a head, a face, head hair, left arm, right arm, left leg, right leg, and so on.

Returning to FIG. 1, low resolution image 122 is received by coarse super resolution module 102, which generates a coarse super resolution image 123 (SR image) using low resolution image 122. Coarse super resolution module 102 may generate coarse super resolution image 123 using any suitable technique or techniques. In some embodiments, coarse super resolution module 102 generates coarse super resolution image 123 using interpolation techniques such as bilinear interpolation or more advanced interpolation techniques. In some embodiments, coarse super resolution module 102 generates coarse super resolution image 123 using a pretrained CNN pretrained using known ground truth super resolution image data. Such embodiments may offer advantages of accuracy particularly when a CNN implemented by coarse super resolution module 102, a CNN implemented by person area parser 104, and a CNN implemented by person fine super resolution module 106 (and optionally a CNN implemented by person pose detection module 103) are pretrained in an end-to-end manner as discussed herein and, in particular, with respect to FIG. 10.

As discussed, coarse super resolution image 123 has a higher resolution for the same image content with respect to low resolution image 122. The resolution ratio between coarse super resolution image 123 and low resolution image 122 may be any suitable value such as 4×(e.g., 2× in the horizontal and vertical dimensions), 16× (e.g., 4× in the horizontal and vertical dimensions), etc. Furthermore, coarse super resolution image 123 is labeled coarse in that it is not as refined with respect to fine super resolution image 126 and/or enhanced fine super resolution image 127. Coarse super resolution image 123 may be characterized as a general coarse super resolution image or simply a coarse super resolution image.

As shown in FIG. 1, coarse super resolution image 123 is provided to person pose detection module 103, person area parser 104, and split detected persons module 105. Notably, coarse super resolution image 123 may allow improved pose detection, area parsing, and persons splitting. However, in some embodiments, low resolution image 122 may be used for such operations to save computation time.

Person pose detection module 103 receives coarse super resolution image 123 (and optionally additional data for person detection 133) and person pose detection module 103 generates pose data 124 corresponding thereto using any suitable technique or techniques. Furthermore, pose data 124 may indicate the pose of the person(s) in coarse super resolution image 123 using any suitable data structure. In some embodiments, pose data 124 includes pose data having a full mapping for each pixel of pose data 124 indicating a probability the pixel corresponds to a particular body part. In some embodiments, pose data 124 includes dense pose data including a dense pose structure indicating several points any any given body part, typically in a grid-like fashion such that a heat map indicating body parts is provided. In some embodiments, pose data 124 includes a most likely body part and a probability of accuracy of the body part. In some embodiments, pose data 124 includes a most likely body part for each pixel. In other embodiments, only pixels that are a high likelihood of including a body part are labeled with the body part. In some embodiments, a pose skeleton is provided such that the skeleton overlays the pixel data of coarse super resolution image 123 and joint locations are indicated by pixel locations therein. In some embodiments, pose data 124 is generated by determining a 3D skeleton corresponding to the person based on additional data for person detection 133 and projecting the 3D skeleton to the 2D image plane of coarse super resolution image 123.

Figure 4:
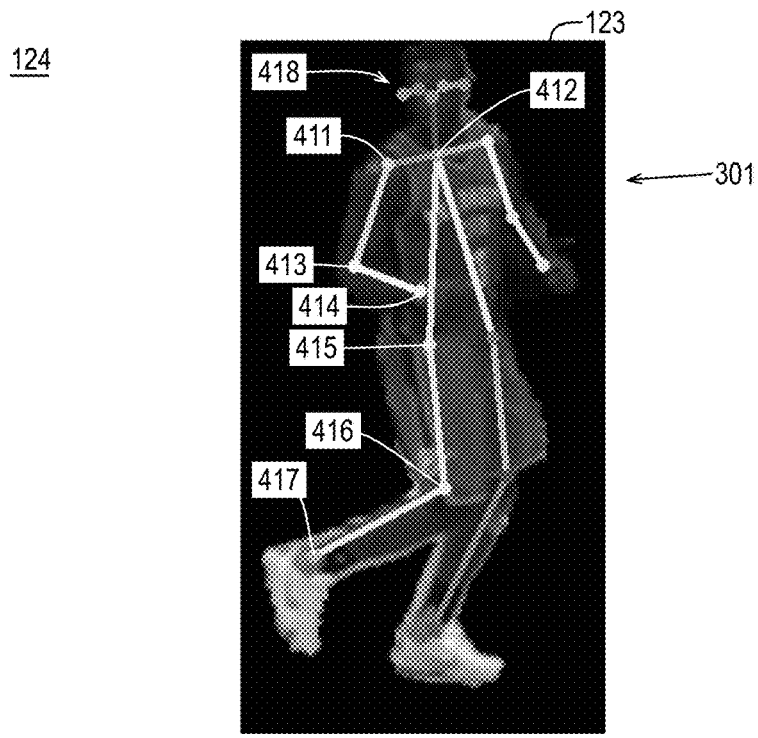
FIG. 4 illustrates example pose data corresponding to an example coarse super resolution image.

FIG. 4 illustrates example pose data 124 corresponding to example coarse super resolution image 123, arranged in accordance with at least some implementations of the present disclosure. As shown in FIG. 4, pose data 124 may include pixel locations corresponding to particular full body features of person 301. Furthermore, as discussed, pose data 124 may indicate a likelihood the pixel locations correspond to the full body features. Such body features may be provided at any level of granularity such as single pixel locations for particular skeletal joints, multiple pixel locations for particular skeletal joints, a detected fully body part for each pixel location, or even a likelihood for each available full body part at each pixel location.

In the example, of FIG. 4, pose data 124 includes at least a pixel location for each of a right shoulder 411, a chest midpoint position 412, a left shoulder (not labeled), a right elbow 413, a left elbow (not labeled), a right wrist 414, a left wrist (not labeled), a right hip 415, a left hip (not labeled), a right knee 416, a left knee (not labeled), a right ankle 417, a left ankle (not labeled), and one or more head features 418. As used herein, the term full body features indicate features pertinent to a pose such that most or all full body features define a pose of a body. Notably, fewer features or more detailed features would not be capable of representing a pose of an entirety of person 301 as discussed herein.

Returning to FIG. 1, person area parser 104 also receives coarse super resolution image 123 (and optionally additional data for person detection 133) and person area parser 104 generates label data 125 corresponding thereto. In some embodiments, person area parser 104 implements a pre-trained CNN to generate label data 125 such that the pre-trained CNN is trained on training images pertinent to the scene and persons being processed. For example, the pre-trained CNN may be pertinent to a particular event (e.g., football, soccer, a play, a concert, etc.) at any level of granularity (e.g., football between including two particular teams, a play including a particular cast, etc.).

Label data 125 may indicate a particular (most likely) label for each pixel of super resolution image 123 such that each particular label is from a set of available labels applied during the pre-training. Label data 125 may also be characterized as parsing data, a parse map, or the like as areas are parsed and labeled. Notably, during pre-training, ground truth labels are provided to train the CNN (optionally in an end-to-end manner as discussed further herein). Such available labels may include any labels pertinent to the person and predefined uniform expected to be attained in super resolution image 123. For example, available labels of helmet background and helmet logo may be used in a scene of football while they are not pertinent, and are therefore not used, in a scene of soccer or a scene of a play or concert. Notably, the resultant label data 125 parses a person not by standard semantic meaning but according to labels specifically designed, during pre-training, for enhancing a resultant super resolution image due to being pertinent to (e.g., corresponding to) a particular event, scene, and persons being imaged. Such techniques provide a tailored CNN trained for and to enhance a specific event at any level of granularity. Such pixel-wise parsing into labels (e.g., area labels) may include any suitable pertinent labels such as, in the example, of a sporting event: jersey, player name, team symbol, logo, trousers, head, legs, shoes, and so on.

Figure 5:
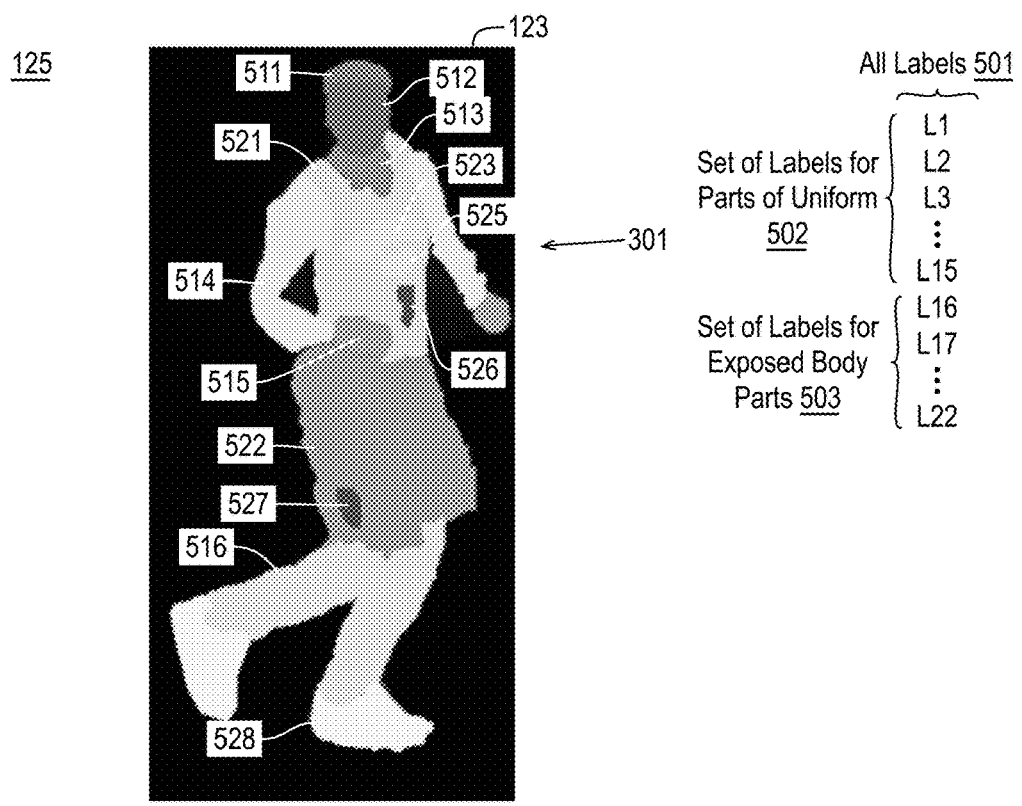
FIG. 5 illustrates example label data corresponding to an example coarse super resolution image.

FIG. 5 illustrates example label data 125 corresponding to example coarse super resolution image 123, arranged in accordance with at least some implementations of the present disclosure. As shown in FIG. 5, label data 125 may include a particular label corresponding to some or all pixel locations of coarse super resolution image 123 such that areas are parsed within coarse super resolution image 123. That is, from all available labels 501, each pixel or some pixels of coarse super resolution image 123 are associated with one of the labels. For example, person area parser 104 may implement a CNN with the color channels (e.g., RGB channels) of coarse super resolution image 123 as the input to the CNN and the output indicating pixel labels or label values for areas of such pixels. It is noted that more available labels 501 as well as available labels 501 that are more specific to a particular scene may be advantageous in providing more detail and, ultimately, higher quality super resolution images.

In the example, of FIG. 5, label data 125 includes person 301 being labeled with the following labels: head hair 511, face 512, neck 513, arm 514, hand 515, leg 516, top jersey background 521, shorts 522, front jersey word mark 523 (as indicated, an additional label to differentiate a front jersey bottom word mark 525 may also be provided), front jersey number 526, shorts patch 527, and shoe 528. However, as discussed, any suitable labels may be used. Notably, all available labels 501 may include subsets of labels such as set of labels for parts of predetermined uniform 502, set of labels for uniformly exposed body parts 503, and so on. In the illustrated example, set of labels for parts of predetermined uniform 502 includes 15 labels as indicated by labels L1 through L15 and set of labels for uniformly exposed body parts 503 includes 7 labels as indicated by labels L16 through L22, however, any number of such labels may be used. Notably, a CNN implemented by person area parser 104 is pretrained on available labels 501. As used herein, the term part of a uniform indicates any component or portion of a uniform as discussed herein (e.g., jersey, player name, team symbol, logo, trousers, shoes, etc.). Furthermore, the term uniformly exposed body part indicates a body part that is known to be exposed when a person where a predetermined uniform. For example, in the context of basketball, it is known that a player's head, neck, arms, hands, and portions of legs are to be uniformly exposed body parts when wearing a predetermined uniform. Similarly, a performer wearing a dress in a play may be known to have uniformly exposed head, neck, arms, hands, and portions of legs when wearing the predetermined uniform. Such uniformly exposed body parts may be any exposed body parts discussed herein. As discussed, since the model granularity can be generic, it is possible that there will be parts in the model that are not present in the specific person (e.g., a helmet in soccer) and the model can nonetheless be applied using the techniques discussed herein. In such embodiments, such labels are not expected to be detected in the corresponding output.

As is discussed further below, label data 125 may provide multiple image channels for or corresponding to coarse super resolution image 123. For example, a binary image or image channel may be generated for each of available labels 501 such that the binary image includes a particular value (e.g., 1) for a pixel having the particular label and another particular value (e.g., 0) for pixels that do not have the particular value. Such binary images or image channels may be concatenated as part of a stack of features for the generation of a fine super resolution image using a CNN as discussed further herein.

Returning to FIG. 1, coarse super resolution image 123, pose data 124, label data 125, and additional data for person detection 133 are provided to split detected persons module 105. Split detected persons module 105, when two or more persons are present in coarse super resolution image 123, splits coarse super resolution image 123, pose data 124, and label data 125 into two or more images containing only a single person each. Such images are indicated by modified coarse super resolution image 123, pose data 124, label data 125. In the continued example herein, only a single person is present; however, split detected persons module 105 may split such images into any number of single person images. It is also noted that, in some embodiments, split detected persons module 105 is not implemented and multiple person images are processed as discussed herein. In yet other embodiments, persons detected by split detected persons module 105 may be used by predetermined uniform knowledge insertion module 142 to generate particular sub-images pertinent to each detected person while processing performed by person fine super resolution module 106 is performed on the multiple person image.

Split detected persons module 105 may split the images or detect persons using any suitable technique or techniques. In some embodiments, split detected persons module 105 splits the persons based on pose data 124 and label data 125 by maintaining person congruity and integrity during an image splitting operation. That is, pixels that are part of a first skeleton and first uniform part and first exposed body part labeling are separated from pixels that are part of a second skeleton and second uniform part and second exposed body part labeling, and so on. In addition or in the alternative, point cloud data or similar information from additional data for person detection 133 may be used to separate persons. For example, persons that appear in the same image may, in space, be separated by relatively large distances that may be detected from a point cloud construction of a scene. Such person splitting techniques may advantageously provide single person images to person fine super resolution module 106 for improved image quality results.

As shown, coarse super resolution image 123, pose data 124, and label data 125 (modified as needed by split detected persons module 105) are provided to person fine super resolution module 106 as a stacked image 132. Notably, images or image channels from coarse super resolution image 123, pose data 124, and label data 125 are stacked to generate a stacked image 132 or image volume as an input to a CNN implemented by person fine super resolution module 106. For example, coarse super resolution image 123 may include multiple color channels (e.g., RGB channels) such that coarse super resolution image 123 has a volume of 3×H×W where W is the width in pixels, H is the height in pixels, and 3 is the number of color channels and therefore coarse super resolution image 123 provides an input volume. Similarly, label data 125 may have a volume of L×H×W where L is the number of available labels 501 with each channel being a binary image channel representative of an available label as discussed further herein below. Pose data 124 also provides an input volume such that the pose data may be provided in a volume of B×H×W where B is the number of unique body parts that can be labeled. It is noted that pose data 124 may be provided as any suitable number of input channels such as a single input channel where pixels have values when any body part is present. The pose data channels may be provided as binary values as discussed with respect to label data 125 or as probability values where a probability value indicates a likelihood that the full body of the channel is present.

As shown, stacked image 132 is provided to person fine super resolution module 106 to generate a fine super resolution image 126. In some embodiments, coarse super resolution image 123 has the same resolution as fine super resolution image 126 with the latter having improved objective and subjective image quality with respect to coarse super resolution image 123. In some embodiments, fine super resolution image 126 has an increased resolution with respect to coarse super resolution image 123. As discussed herein, a CNN implemented by person fine super resolution module 106 is pretrained to training images relevant to expected stacked images. That is, a pretrained soccer CNN is implemented for soccer events or even a pretrained soccer CNN for a particular matchup of clubs wearing specific home and away uniforms for the particular matchup, a pretrained CNN for a play with particular uniform costumes is implemented for the play, and so on at any level of granularity. Notably, person fine super resolution module 106 receives label data 125 (e.g., parse maps), pose data 124 (e.g., a person skeleton), and coarse super resolution image 123 and outputs a high quality fine super resolution image 126, which may be provided as a final output by apparatus 100. Since person fine super resolution module 106 is pretrained in a person specific and optionally uniform specific manner, it may use such inputs to enforce person constraints and uniform constraints for enhanced super resolution of images representative of a person wearing a predetermined uniform.

Figure 6:
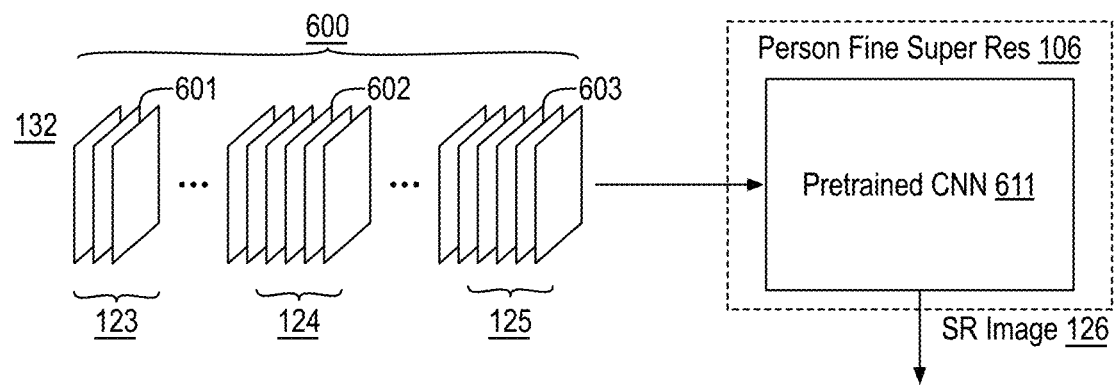
FIG. 6 illustrates application of an example pretrained CNN to an example stacked image corresponding to an example coarse super resolution image.

FIG. 6 illustrates application of an example pretrained CNN 611 to an example stacked image 132 corresponding to example coarse super resolution image 123, arranged in accordance with at least some implementations of the present disclosure. As shown in FIG. 6, stacked image 132 may include multiple images or image channels 600 including images or image channels 601 from coarse super resolution image 123, images or image channels 602 from pose data 124, and images or image channels 603 from label data 125. As shown, stacked image 132 (e.g., a stacked image volume of image channels) is provided to pretrained CNN 611 as implemented by person fine super resolution module 106 to generate fine super resolution image 126. Pretrained CNN 611 may include any suitable CNN such as a CNN including an input layer, any number of hidden layers employing convolutional layers and filters, a fully connected layer, and an output layer.

Stacked image 132 may include any number of images or image channels 600. In the illustrated embodiment, images or image channels 601 include three image channels, one each for the RGB channels of coarse super resolution image 123. Although illustrated with six images or image channels 602, images or image channels 602 from pose data 124 may include any number of images or image channels such as a number corresponding to the number of unique full body parts indicated or labeled by pose data 124. Similarly, although illustrated with six images or image channels 603, images or image channels 603 from label data 125 may include any number of images or image channels such as a number corresponding to the number of available labels 501.

Figure 7:
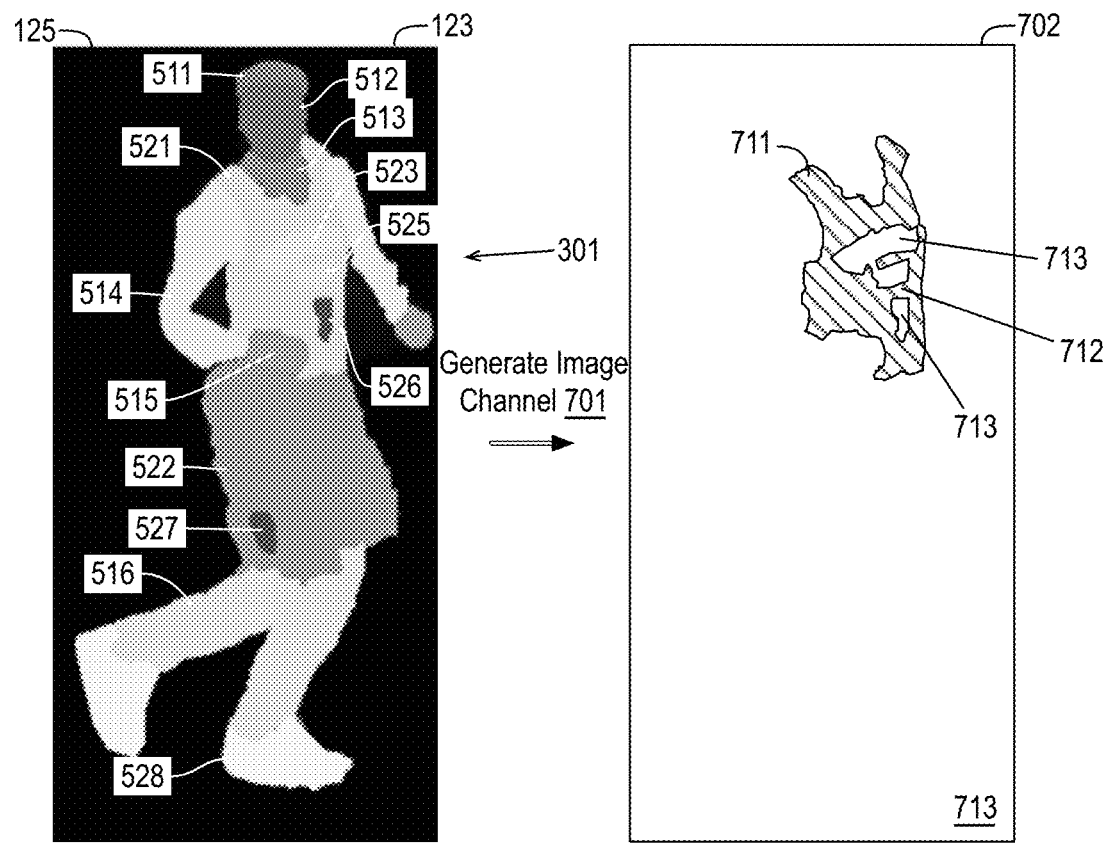
FIG. 7 illustrates an example image or image channel representative of a particular label from label data corresponding to an example coarse super resolution image.

FIG. 7 illustrates an example image or image channel 702 representative of a particular label from label data 125 corresponding to example coarse super resolution image 123, arranged in accordance with at least some implementations of the present disclosure. As shown in FIG. 7, a particular image or image channel of images or image channels 603 is generated for top jersey background 521 (e.g., a particular label) via a generate image channel operation 701. For a region 711 of the resultant image or image channel 702 that corresponds to top jersey background 521, \ pixel values 712 thereof are set to a first value (e.g., 1) while pixel values 713 for regions of image or image channel 702 that are not a part of region 711 are set to a second value (e.g., 0).

Thereby, a binary image or image channel 702 (or a binary mask) is generated relative to top jersey background 521. For each of available labels 501, a similar operation is performed to generate a binary image or image channel for each of the labels. That is, with reference to FIG. 6, each image or image channel 603 for each label of predetermined set of available labels 501 is a binary image, image channel, or mask having a first value (e.g., 1) for pixels associated with each of the predetermined set of available labels 501 and a second value (e.g., 0) for pixels not associated with each of the predetermined set of labels. Notably, for any label that does not have a corresponding label area in label data 125, the binary image, image channel, or mask may contain all 0 values. In other embodiments, image or image channel 702 includes a probability value for each pixel thereof relative to the particular label. For example, for top jersey background 521 (e.g., a particular label), each pixel of image or image channel 702 may include a probability value that the pixel corresponds to top jersey background 521 with low values indicating low probability and high values indicating high probability.

Returning to FIG. 6, each of images or image channels 603 (e.g., binary image masks corresponding to each of available labels 501) are concatenated to form a part of stacked image 132. Turning now to images or image channels 602, images or image channels 602 may also include binary images for full body parts as indicated by pose data 124 or images or image channels 602 may include probabilities of such body parts, or images or image channels 602 may include a single image with binary pixel values indicating a part of a skeleton or not.

Figure 8:
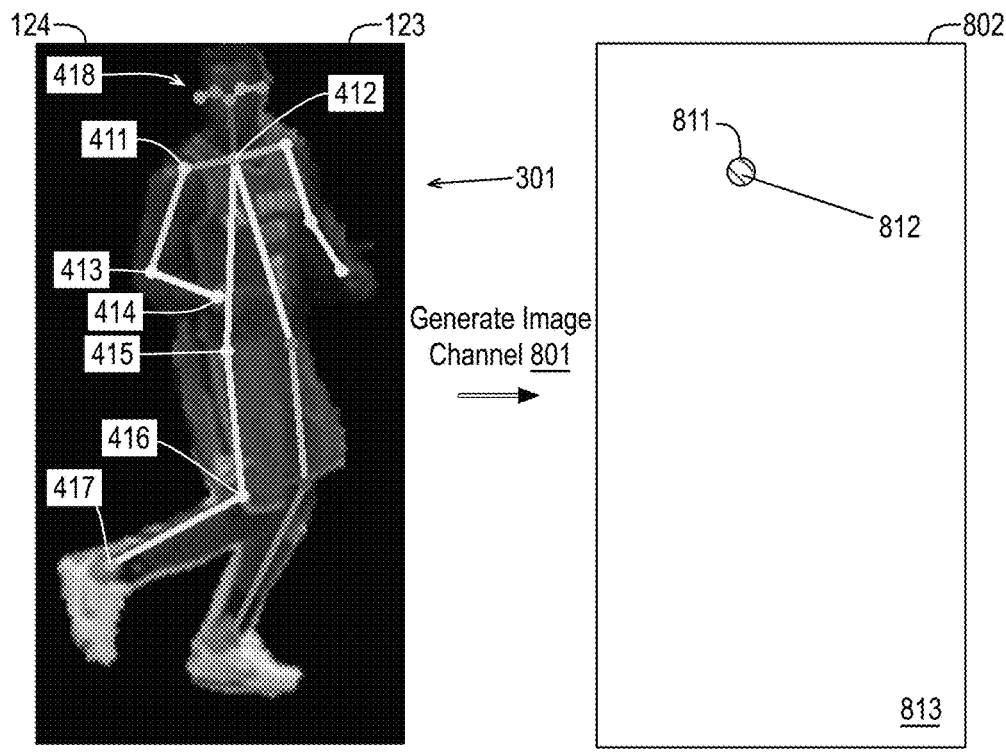
FIG. 8 illustrates an example image or image channel representative of a particular fully body part from pose data corresponding to an example coarse super resolution image.

FIG. 8 illustrates an example image or image channel 802 representative of a particular fully body part from pose data 124 corresponding to example coarse super resolution image 123, arranged in accordance with at least some implementations of the present disclosure. As shown in FIG. 8, a particular image or image channel of images or image channels 602 may be generated for right shoulder 411 (e.g., a particular full body part) via a generate image channel operation 801. For a region 811 of the resultant image or image channel 802 that corresponds to right shoulder 411, pixel values 812 thereof may be set to a first value (e.g., 1) while pixel values 813 for regions of image or image channel 802 that are not a part of region 811 are set to a second value (e.g., 0).

For example, a binary image or image channel 802 (or a binary mask) may be generated for right shoulder 411. Furthermore, for each full body part available to be identified by pose data 124, a binary image or image channel may be generated. That is, with reference to FIG. 6, each image or image channel 602 for each full body part available to be identified may be a binary image, image channel, or mask having a first value (e.g., 1) for pixels associated with each of the full body parts available to be identified and a second value (e.g., 0) for pixels not associated therewith. Notably, for any full body part that does not appear in pose data 124, the binary image, image channel, or mask may include contain all 0 values.

Figure 9:
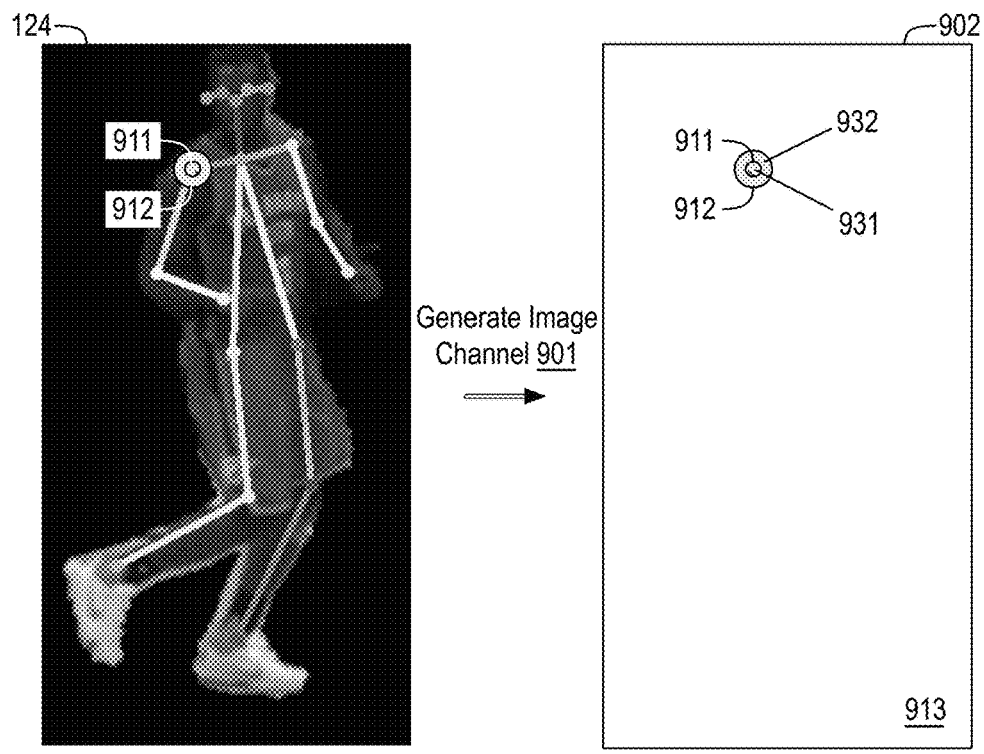
FIG. 9 illustrates another example image or image channel representative of a particular fully body part from pose data corresponding to an example coarse super resolution image.

FIG. 9 illustrates another example image or image channel 902 representative of a particular fully body part from pose data 124 corresponding to example coarse super resolution image 123, arranged in accordance with at least some implementations of the present disclosure. As shown in FIG. 9, a particular image or image channel of images or image channels 602 may be generated for right shoulder 411 (e.g., a particular full body part) via a generate image channel operation 901. As shown, in some embodiments, for particular full body parts, pose data 124 may include probability values indicating the probability a pixel of coarse super resolution image 123 corresponds to the particular full body part. In the illustrated embodiment, a first region 911 of pose data 124 has a first probability the pixels therein correspond to a right shoulder and a second region 912 having a second probability the pixels therein correspond to the right shoulder such that the first probability is greater than the second probability. Although illustrated with first and second regions 911, 912 that are concentric and have first and second values, any particular shapes and numbers of values may be implemented.

After image channel operation 901, image or image channel 902 includes first region 911 having first probability values 931 therein and second region 912 having second probability values 932 therein (as well as zero probability values 913). As noted above, first probability values 931 (which may all be the same values or differing values) may all be greater than any of second probability values 932 (which, again, may all be the same values or differing values. Thereby, an image or image channel 902 (or a probability values mask) may be generated for right shoulder 411. Furthermore, for each full body part available to be identified by pose data 124, a similar probability values based image or image channel may be generated. That is, with reference to FIG. 6, each image or image channel 602 for each full body part available to be identified may be a probability values based image or image channel (or probability values mask) having values (e.g., ranging from 0 to 1 inclusive at any bit depth) for pixels associated with each of the full body parts available to be identified via pose data 124.

Returning to FIG. 1, as discussed, person fine super resolution module 106 may apply a CNN to stacked image 132 to generate fine super resolution image 126. As discussed, stacked image 132 may have any number of images or image channels to generate a stacked image volume for processing. For example, the stacked image may be a deep image volume for processing by a CNN. In some embodiments, fine super resolution image 126 is provided for presentment to a viewer. Fine super resolution image 126 may be provided for presentment using any suitable technique or techniques. In an embodiment, providing a final super resolution image (e.g., fine super resolution image 126 or enhanced fine super resolution image 127) for presentment to a viewer includes transmitting the final super resolution image to a receiving device having a display screen. In an embodiment, providing the final super resolution image for presentment to the viewer includes transmitting the final super resolution image to a local display. In an embodiment, providing the final super resolution image for presentment to the viewer includes transmitting the final super resolution image to a memory. As used herein, providing an image for presentation or presentment includes transmitting the image to a display device, storing the image to memory for later display, and/or transmitting the image to another device for display at that device. Furthermore, in some embodiments, the final super resolution image is used (along with another final super resolution image, for example) to generate an intermediate virtual view, which may be provided for presentment to a viewer using any of the techniques discussed herein.

Discussion now turns to pretraining apparatus 100. As discussed, various components of predetermined uniformed person super resolution pipeline 141 may be implemented using CNNs. In some embodiments, coarse super resolution module 102, person area parser 104, person fine super resolution module 106 each implement separate CNNs. In some embodiments, coarse super resolution module 102, person pose detection module 103 person area parser 104, and person fine super resolution module 106 each implement separate CNNs.

Figure 10:
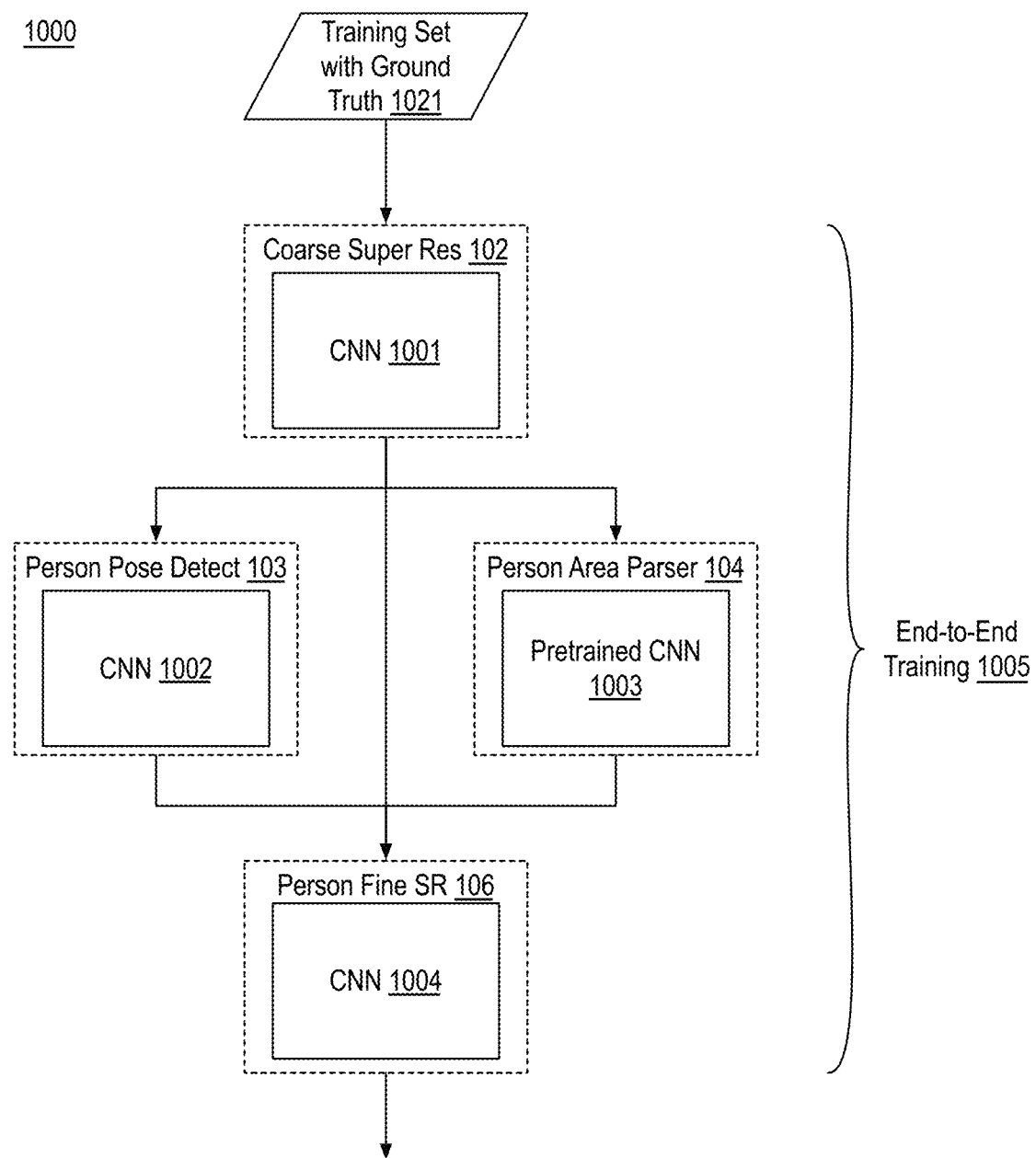
FIG. 10 illustrates an example device for pretraining convolutional neural networks.

FIG. 10 illustrates an example apparatus 1000 for pretraining convolutional neural networks, arranged in accordance with at least some implementations of the present disclosure. As shown in FIG. 10, apparatus 1000 may include coarse super resolution module 102 implementing a CNN 1001, person pose detection module 103 implementing a CNN 1002, person area parser 104 implementing a CNN 1003, and person fine super resolution module 106 implementing a CNN 1004. Notably, apparatus 1000 may provide pretraining for any or all of CNNs 1001, 1002, 1003, 1004, which may then be saved (e.g., data structures including CNN filters and weights are stored) for implementation via apparatus 100. In some embodiments, architectures of CNNs 1001, 1002, 1003, 1004 are selected (e.g., number of filters, layers, layer formats, etc.) and the pretraining trains weights and other parameters of architecture CNNs 1001, 1002, 1003, 1004. As discussed, some or all of coarse super resolution module 102, person pose detection module 103, person area parser 104, and person fine super resolution module 106 may implement CNNs. In some embodiments, one or more of coarse super resolution module 102, person pose detection module 103, person area parser 104, and person fine super resolution module 106 do not implement a CNN. Notably, person pose detection module 103 may not implement a CNN in some advantageous embodiments.

As shown, apparatus 1000 receives a training set with ground truth information 1021. In some embodiments, training set with ground truth information 1021 includes images of persons wearing predetermined uniforms. Such persons, their poses, and the predetermined uniforms may be any such characteristics pertinent to a particular scene or event for which the components of apparatus 1000 are being trained. For example, predetermined available labels 501 may be selected for the scene and event. Notably, the training of apparatus 1000 may be performed for any number of sets of training data pertinent to particular scenes and corresponding individual CNNs 1001, 1002, 1003, 1004 are trained for each set of training data. In some embodiments, CNNs 1001, 1002, 1003, 1004 are generically trained without uniform specifics. For example, CNNs 1001, 1002, 1003, 1004 may be generically trained for football and soccer and a play. In other embodiments, CNNs 1001, 1002, 1003, 1004 are separately trained for each specific uniform. For example, one set of CNNs 1001, 1002, 1003, 1004 for soccer may be trained using one training set, another set of CNNs 1001, 1002, 1003, 1004 for football may be trained using another training set, yet another set of CNNs 1001, 1002, 1003, 1004 for a play may be trained using yet another training set, and so on. Furthermore, any level of granularity may be used. In some embodiments, one set of CNNs 1001, 1002, 1003, 1004 are trained using a training set for one or two particular basketball teams, another set of CNNs 1001, 1002, 1003, 1004 are trained using a training set for another basketball team, and so on. Similarly, in some embodiments, one set of CNNs 1001, 1002, 1003, 1004 are trained using a training set for a particular play cast, another set of CNNs 1001, 1002, 1003, 1004 are trained using a training set for another particular play cast, and so on.

A particular training set with ground truth information 1021 may include any number of low resolution images, corresponding final super resolution images (i.e., the desired resultant SR image), corresponding label data, and corresponding pose data. In some embodiments, training set with ground truth information 1021 includes images having entireties of persons wearing uniforms and exposing uniformly exposed body parts as discussed herein. For example, desired resultant SR images (e.g., about 500 such images, about 1,000 such images, or more) may be attained and downsampled to generate low resolution input images. Furthermore, corresponding pose data and label data (using full body parts and labels to be used during implementation) are generated by manually marking the desired resultant SR images such that ground truth information 1021 corresponding to the desired outputs of CNNs 1001, 1002, 1003, 1004 are known.

Then, as shown, each of CNNs 1001, 1002, 1003, 1004 are trained in an end-to-end training 1005 such that the CNN learning optimizes the weights of each of CNNs 1001, 1002, 1003, 1004 using the inputs and outputs directly (and without any intermediate manual adjustments of the CNNs). In some embodiments, the end-to-end training includes back propagation of error generated during training.

Returning again to FIG. 1, as shown, predetermined uniform knowledge insertion module 142 may generate a sub-image 131, which may be merged with fine super resolution image 126 to generate enhanced fine super resolution image 127. As used herein, the term sub-image indicts an image or image data having discrete portion thereof that are smaller than a full image. Notably, sub-image 131 may include a single sub-image having smaller dimensions than fine super resolution image 126 or multiple such sub-images. The one or more sub-images of sub-image 131 are to enhance fine super resolution image 126 by implementing pre-known details corresponding thereto such as uniform texture elements (e.g., logos, patches, piping, etc.) attained from a uniform database 112 and optimized as discussed herein.

For example, person recognition module 108 may receive low resolution image 121 (or coarse super resolution image 123) and person recognition module 108 may perform person recognition to generate identity data 128 (e.g., an identity) corresponding to the person therein. Person recognition module 108 may perform person recognition using any suitable technique or techniques. In some embodiments, person recognition module 108 may perform any of a variety of available person recognition techniques depending on the information available in low resolution image 121, coarse super resolution image 123, or even additional data for person detection 133. In some embodiments, person recognition module 108 performs face recognition to generate identity data 128. In some embodiments, person recognition module 108 may perform text detection to recognize a number on a uniform of a particular person, which may be correlated to identify the person. In some embodiments, particularly when a uniform number is occluded in low resolution image 121 or coarse super resolution image 123, either multi-view image information (from additional data for person detection 133) may be used to detect the number and identify the person and/or person tracking may be used to infer a person identity in low resolution image 121 or coarse super resolution image 123.

In addition or in the alternative, person recognition module 108 may detect a particular feature of low resolution image 121 or coarse super resolution image 123 that identifies the person or a class of the person. For example, a team jersey or portion thereof may be detected and detection of the particular feature may indicate the person is on a particular team. Similarly, a particular costume or portion thereof may be detected and detection of the particular feature may indicate the person is wearing a particular costume in a play.

In either case, identity data 128, which identifies a particular person or a class of persons, may be used to gather uniform portions, patches, etc. as from uniform database 112. For example, fine super resolution image 126 may not have particular detail that can be filled in from a previously imaged and saved sub-image such as a word mark on a uniform, a number on a uniform, a patch on a uniform, piping or other details of a uniform, etc. Based on identity data 128, such detailed sub-images (previously attained and stored) are fetched from uniform database 112 by uniform and patch detection module 109. Uniform and patch detection module 109 attains particular details as pertinent to identity data 128 in preparation for preparing sub-images corresponding thereto into fine super resolution image 126. For example, a uniform portion having high detail content and/or other details such as patches corresponding to a uniform (e.g., a uniform may have different patches stitched thereon that vary from match to match or performance to performance) may be fetched from uniform database 112. In some embodiments, uniform portions are detected using a classifier of known uniforms (e.g., from the participating teams) in low resolution image 121 or coarse super resolution image 123 and the corresponding sub-images are attained from uniform database 112.

As shown, pose based projection module 110 receives one or more image patches 129 for low resolution image 121 or coarse super resolution image 123 from uniform and patch detection module 109 and pose based projection module 110 projects image patches 129 to the image plane corresponding to low resolution image 121 or coarse super resolution image 123. For example, image patches 129 as retrieved from uniform database 112 may be images attained using a camera trained on image patches 129, an external image, or a graphics generated image such that, in any case, image patches 129 are flat and the plane thereof is parallel or substantially parallel to the image plane of the camera. However, the desired orientation of image patches 129 on low resolution image 121 or coarse super resolution image 123 may require image patches 129 to be scaled, rotated, and/or warped to the image plane of low resolution image 121 or coarse super resolution image 123 to generate one or more projected image patches 130. In an embodiment, using a 3D pose detected (as indicated by additional data for person detection 133) and knowledge of the position of the camera, the high detail item or image patch 129 (e.g., a person name, detected patches, sponsor logo, etc.) may be placed in the relevant position on the model and projected onto the camera plane of low resolution image 121 and coarse super resolution image 123. Such techniques allow apparatus 100 to restore fine details that were lost during imaging based on prior knowledge of the predetermined uniform and person wearing the predetermined uniform.

Figure 11:
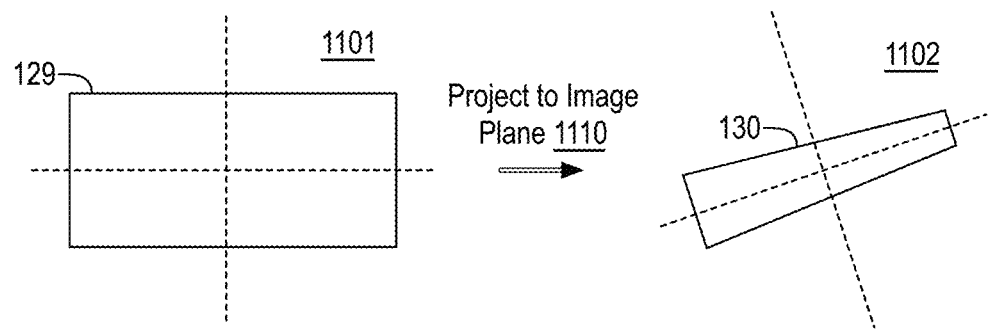
FIG. 11 illustrates an example projection of an example image patch to a projected image patch.

FIG. 11 illustrates an example projection of an example image patch 129 to a projected image patch 130, arranged in accordance with at least some implementations of the present disclosure. As shown in FIG. 11, image patch 129 as attained from uniform database 112 may be flat and square relative to a first image plane 1101 used to attain image patch 129. For example, image patch 129 may be a word mark or other texture detail that is best attained when image plane 1101 and a plane of image patch are aligned. Also, as shown via projection operation 1110, image patch 129 may be projected from first image plane 1101 to a second image plane 1102 to generate projected image patch 130. For example, second image plane 1102 may correspond to an image plane defined by relative positions of a camera used to attain low resolution image 121 and the person of the image. That is, predefined image patch 129 is projected from a predefined image plane to an image plane defined by relative positions of a camera used to attain low resolution image 121 and the person that is the subject of predefined image patch 129 and low resolution image 121.

Returning to FIG. 1, as shown, projected image patch 130 is provided to color adjustment module 111, which generates sub-image 131. In some embodiments, each projected component (e.g., each projected image patch 130) is tied to its corresponding label in label data 125 (e.g., a parse map) as received from split detected persons module 105 or person pose detection module 103. Each component (e.g., each projected image patch 130) may then be warped (as needed) to adjust its size to that of the detected label area. Finally, coarse super resolution image 123, label data 125, and the warped projected image patch 130 are stacked and fed into a network such as a CNN designed and pretrained to transfer actual scene lighting conditions to projected image patch 130. In some embodiments, a CNN implemented by color adjustment module 111 is pretrained using high resolution images as ground truth. In some embodiments, the high resolution images are downscaled and then upscaled to create input SR input. Ground truth label data may be generated using automatic detection techniques or manual labeling.

Figure 12:
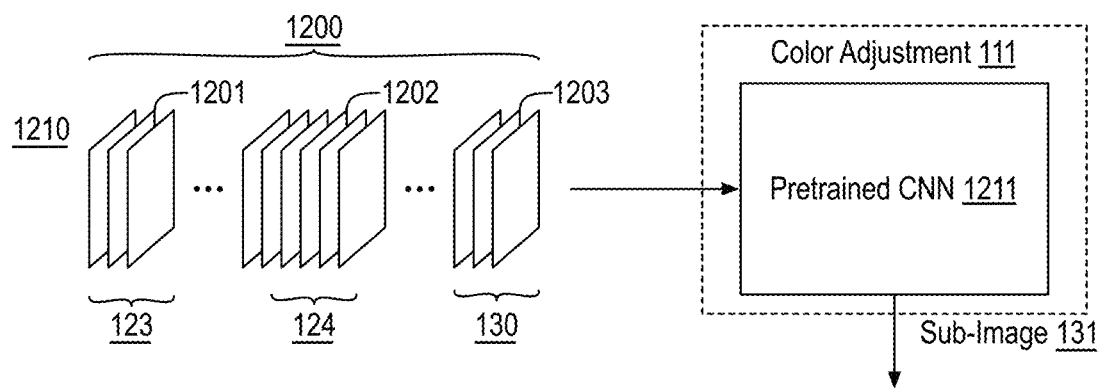
FIG. 12 illustrates application of an example pretrained convolutional neural network to an example stacked image for color adjustment.

FIG. 12 illustrates application of an example pretrained convolutional neural network 1211 to an example stacked image 1210 for color adjustment, arranged in accordance with at least some implementations of the present disclosure. As shown in FIG. 12, a stacked image 1210 may be generated such that stacked image 1210 includes multiple images or image channels 1200 including images or image channels 1201 from coarse super resolution image 123, images or image channels 1202 from pose data 124, and images or image channels 1203 from one or more projected image patches 130. As shown, stacked image 1210 (e.g., a stacked image volume of image channels) is provided to pretrained CNN 1211 as implemented by color adjustment module 111 to generate fine super resolution image 126. Pretrained CNN 1211 may include any suitable CNN as discussed herein.

Stacked image 1210 may include any number of images or image channels 1200. In an embodiment, images or image channels 1201 include three image channels, one each for the RGB channels of coarse super resolution image 123 and images or image channels 1202 include one image channel for each of available labels 501. For example, images or image channels 1202 may be binary images or masks as discussed herein and in particular with respect to 7. Furthermore, images or image channels 1203 may include three image channels, one each for the RGB channels of projected image patches 130. It is noted that projected image patches 130 may include only image patches aligned with and projected to their correct positions relative to coarse super resolution image 123 as discussed herein.

Each of images or image channels 1200 are concatenated to form stacked image 1210. Color adjustment module 111 applies pretrained CNN 1211 to stacked image 1210 to generate sub-image 131. In some embodiments, pretrained CNN 1211 is pretrained separately with respect to the CNNs of predetermined uniformed person super resolution pipeline 141.

Returning to FIG. 1, sub-image 131 and fine super resolution image 126 are received by image blending module 107, which blends sub-image 131 and fine super resolution image 126 using any suitable technique or techniques to generate enhanced fine super resolution image 127. In some embodiments, image blending module 107 blends sub-image 131 and fine super resolution image 126 using Poisson image blending techniques. As discussed with respect to fine super resolution image 126, enhanced fine super resolution image 127 be provided for presentment to a viewer using any suitable technique or techniques such as transmission to a local display device, transmission to a remote display device, storage to memory for later display, or by generating a virtual view image using enhanced fine super resolution image 127 and displaying, transmitting, or storing the resultant virtual view image for presentment.

Figure 13:
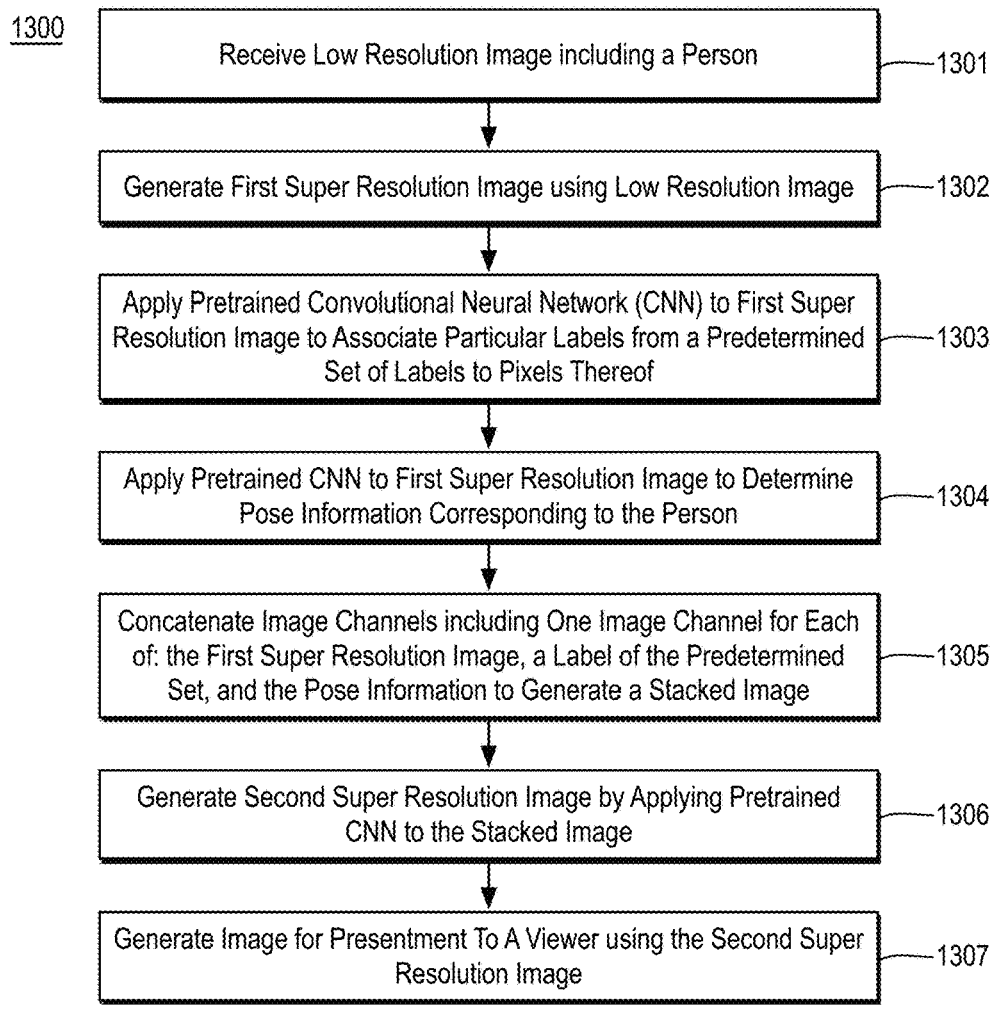
FIG. 13 is a flow diagram illustrating an example process for generating a super resolution image.

FIG. 13 is a flow diagram illustrating an example process 1300 for generating a super resolution image, arranged in accordance with at least some implementations of the present disclosure. Process 1300 may include one or more operations 1301-1307 as illustrated in FIG. 13. Process 1300 may form at least part of a super resolution image generation process. By way of non-limiting example, process 1300 may form at least part of a super resolution image generation process as performed by apparatus 100 as discussed herein. Furthermore, process 1300 will be described herein with reference to system 1400 of FIG. 13.

Figure 14:
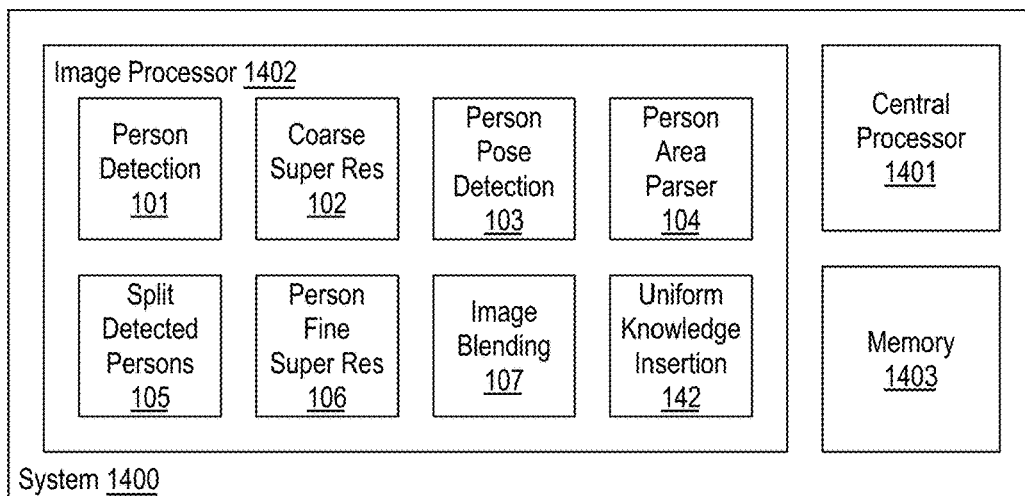
FIG. 14 is an illustrative diagram of an example system for generating a super resolution image.

FIG. 14 is an illustrative diagram of an example system 1400 for generating a super resolution image, arranged in accordance with at least some implementations of the present disclosure. As shown in FIG. 13, system 1400 may include a central processor 1401, an image processor 1402, and a memory 1403 Also as shown, image processor 1402 may include or implement person detection module 101, coarse super resolution module 102, person pose detection module 103, person area parser 104, split detected persons module 105, person fine super resolution module 106, image blending module 107, and predetermined uniform knowledge insertion module 142. In the example of system 1400, memory 1403 may store image or frame data, low resolution image or frame data, super resolution image or frame data, pose data, label data, sub-image data, CNN weights, or any other data discussed herein.

As shown, in some examples, one or more or portions of person detection module 101, coarse super resolution module 102, person pose detection module 103, person area parser 104, split detected persons module 105, person fine super resolution module 106, image blending module 107, and predetermined uniform knowledge insertion module 142 are implemented via image processor 1402. In other examples, one or more or portions of person detection module 101, coarse super resolution module 102, person pose detection module 103, person area parser 104, split detected persons module 105, person fine super resolution module 106, image blending module 107, and predetermined uniform knowledge insertion module 142 are implemented via central processor 1401, an image processing unit, an image processing pipeline, an image signal processor, or the like. In some examples, one or more or portions of person detection module 101, coarse super resolution module 102, person pose detection module 103, person area parser 104, split detected persons module 105, person fine super resolution module 106, image blending module 107, and predetermined uniform knowledge insertion module 142 are implemented in hardware as a system-on-a-chip (SoC). In some examples, one or more or portions person detection module 101, coarse super resolution module 102, person pose detection module 103, person area parser 104, split detected persons module 105, person fine super resolution module 106, image blending module 107, and predetermined uniform knowledge insertion module 142 are implemented in hardware via a FPGA.

Image processor 1402 may include any number and type of image or graphics processing units that may provide the operations as discussed herein. Such operations may be implemented via software or hardware or a combination thereof. For example, image processor 1402 may include circuitry dedicated to manipulate and/or analyze images obtained from memory 1403. Central processor 1401 may include any number and type of processing units or modules that may provide control and other high level functions for system 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory. In an embodiment, one or more or portions of person detection module 101, coarse super resolution module 102, person pose detection module 103, person area parser 104, split detected persons module 105, person fine super resolution module 106, image blending module 107, and predetermined uniform knowledge insertion module 142 are implemented via an execution unit (EU) of image processor 1402. The EU may include, for example, programmable logic or circuitry such as a logic core or cores that may provide a wide array of programmable logic functions. In an embodiment, one or more or portions of person detection module 101, coarse super resolution module 102, person pose detection module 103, person area parser 104, split detected persons module 105, person fine super resolution module 106, image blending module 107, and predetermined uniform knowledge insertion module 142 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where a low resolution image including an entirety of at least one person. The low resolution image may be at any resolution and may be attained from a camera (or image preprocessor), memory, another device, etc. In some embodiments, the person is wearing a predetermined uniform and the predetermined uniform is a particular sports uniform, the least one person is in a sporting scene corresponding to the particular sports uniform, and the low resolution image is a portion of a full image attained from one of multiple cameras each recording images of the scene at a resolution of not less than 4 k resolution. In some embodiments, the predetermined uniform is a particular costume, the least one person is in an entertainment scene corresponding to the particular costume, and the low resolution image is a portion of a full image attained from one of multiple cameras each recording images of the scene at a resolution of not less than 4 k resolution. As used herein, the term full image indicates an image that has not been cropped from its full size from a camera. Furthermore, as discussed, an image including an entirety of a person indicates that no part of the person extends outside of the image.

Processing continues at operation 1302, where a first super resolution image is generated using the low resolution image such that the first super resolution image has a greater resolution than the low resolution image. The resolution difference or ratio between the first super resolution image and the low resolution image may be any suitable value such as a 4× resolution ratio (e.g., 2× pixel density increase in the horizontal and vertical dimensions), a 16× resolution ratio (e.g., 4× pixel density increase in the horizontal and vertical dimensions), or any other suitable value. The first super resolution image may be generated from the low resolution image using any suitable technique or techniques. In some embodiments, the first super resolution image is generated using interpolation techniques. In some embodiments, first super resolution image may be generated by applying a pretrained CNN to the low resolution image. As discussed with respect to operations 1303, 1306, pretrained CNNs may also be applied to generate label data (e.g., associate particular labels from a predetermined set of labels to pixels of the first super resolution image) and to generate a second super resolution image (e.g., by applying the CNN to a stacked image as discussed below 0. In some embodiments, such CNNs are pretrained in an end-to-end manner based on a training set of images comprising entireties of persons wearing uniforms. For example, in the training set of images, the persons may be in poses and the uniforms may be pertinent to the person, pose, and predetermined uniform expected in the low resolution image attained at operation 1301.

Processing continues at operation 1303, where a pretrained convolutional neural network is applied to the first super resolution image to associate particular labels from a predetermined set of labels to pixels of the first super resolution image such that the predetermined set of labels include a set of labels each corresponding to at least a part of clothing or a body part of the at least one person. In some embodiments, the set of labels include first labels each corresponding to a part of a predetermined uniform worn by the at least one person and second labels each corresponding to a predetermined uniformly exposed body part corresponding to the predetermined uniform. For example, process 1300 may be performed for any clothing generically or for a predetermined uniform (e.g., a uniform known to be present in a subsequently imaged scene). The predetermined uniform may include predetermined parts or portions (e.g., shirt, trousers, socks, shoes, etc.) and a corresponding label for each of the parts or portions are predefined. Furthermore, the predetermined uniform may uniformly expose particular body parts (e.g., a head, arms, parts of legs, etc.) and a corresponding label for each of the uniformly expose particular body parts are also defined. The pretrained convolutional neural network is pretrained using the labels in a training phase and, during the implementation phase, an input first super resolution image is labeled (e.g., pixel-wise) with the most likely predefined labels. Such particular labels for the first super resolution image may be characterized as label data, a label mask, parsing data, parsing area data, or the like.

Processing continues at operation 1304, where pose information corresponding to the at least one person is determined using the first super resolution image. The pose information may be determined using any suitable technique or techniques. In some embodiments, the pose information is generated using dense key point model techniques. In some embodiments, the pose information is generated using skeleton pose generation techniques. As discussed, the pose information may be generated using the first super resolution image and other available information such as images from other cameras, point cloud data, etc. The pose information may have any suitable data structure that corresponds pixels of the first super resolution image with likely full body parts in a particular pose such as images indicating most likely full body parts, heat maps, or groups of binary images for each full body part.

Processing continues at operation 1305, where multiple image channels including at least one image channel corresponding to each of: the first super resolution image, a label of the predetermined set of labels, and the pose information are concatenated to generate a stacked image for processing by a CNN. In some embodiments, the multiple image channels of the stacked image include a channel for each color channel of the first super resolution image generated at operation 1302, a channel for each of the predetermined set of labels evaluated at operation 1303, and a channel for each full body part identified by the pose information determined at operation 1304.

In some embodiments, each channel for each of the predetermined set of labels is a binary image having a first value for pixels associated with each of the predetermined set of labels and a second value for pixels not associated with each of the predetermined set of labels. For example, each image channel of the stacked image for the predetermined set of labels may be a binary image (such that each binary image is pertinent to one of the predetermined labels) that has a value of one for pixels deemed to correspond to the label and a value of zero for those that do not correspond to the label. Such images or image channels may be characterized as binary images, binary label maps, or binary maps.

In some embodiments, each channel for each full body part identified by the pose information is a probability map having probability values for pixels thereof, each probability value indicating a probability the pixel is associated with each full body part identified by the pose information. For example, each image channel of the stacked image for the pose information may be a probability map having a probability value for pixels thereof that indicates a likelihood the pixel corresponds to the particular full body part. In some embodiments, each channel for each full body part identified by the pose information is a binary image having a first value for pixels associated with the full body part and a second value for pixels not associated with the full body part. For example, each image channel of the stacked image for the each full body part may be a binary image (such that each binary image is pertinent to one of the available full body parts) that has a value of one for pixels deemed to correspond to the full body part and a value of zero for those that do not correspond to the full body part.

Processing continues at operation 1306, where a second super resolution image is generated by applying a pretrained convolutional neural network to the stacked image generated at operation 1305. The pretrained CNN may have any suitable architecture. In some embodiments, the CNN is a fully convolutional CNN. The second super resolution image has the same resolution as the first super resolution image but is refined in terms of subjective and objective image quality.

Processing continues at operation 1307, where an image is generated for presentment to a viewer using the second super resolution image. The image may be generated using any suitable technique or techniques such as merging the second super resolution image into a scene, generating a virtual view using the second super resolution image, providing the second super resolution image as a zoom image, etc. Furthermore, the presentment of the image may include presenting the image or resultant image via a local display, transmitting the image or resultant image for display at a remote device, or storing the image or resultant image for later presentation via a display.

In some embodiments, the image may be generated by merging the second super resolution image with a sub-image generated using a predetermined image patch that is identified based in part on the at least one person wearing the predetermined uniform. In an embodiment, process 1300 further includes detecting one of an identify of the at least one person or a particular feature of the at least one person using the low resolution image or the first super resolution image, attaining, from memory, a predetermined image patch using the identify or the particular feature, generating a sub-image from the predefined image patch, and merging the second super resolution image and the sub-image, wherein generating the image for presentment is based on the merged image. In some embodiments, generating the sub-image includes projecting the predefined image patch to an image plane defined by relative positions of a camera used to attain the low resolution image and the at least one person to generate a projected image patch. In some embodiments, generating the sub-image includes projecting the predefined image patch to an image plane defined by relative positions of a camera used to attain the low resolution image and the at least one person to generate a projected image patch, concatenating the channel corresponding to the first super resolution image, the channel corresponding to the label of the predetermined set of labels, and the projected image patch to generate a second stacked image, and applying a pretrained convolutional neural network to the second stacked image to generate the sub-image such that the pretrained convolutional neural network is pretrained separately from the previously discussed pretrained convolutional neural networks using a training image set including predetermined lighting conditions of a predetermined scene corresponding to the predetermined uniform Process 1300 may be repeated any number of times either in series or in parallel for any number of input images, video frames, or the like. Process 1300 may provide for super resolution images, image frames, video frames, etc. that correspond to a low resolution image including a person wearing a predetermined uniform.

Process 1300 may be implemented by any suitable device, system, or platform such as those discussed herein. In an embodiment, process 1300 is implemented by a device having a memory to store images, as well as any other discussed data structure, and a processor to perform operations 1301-1307. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
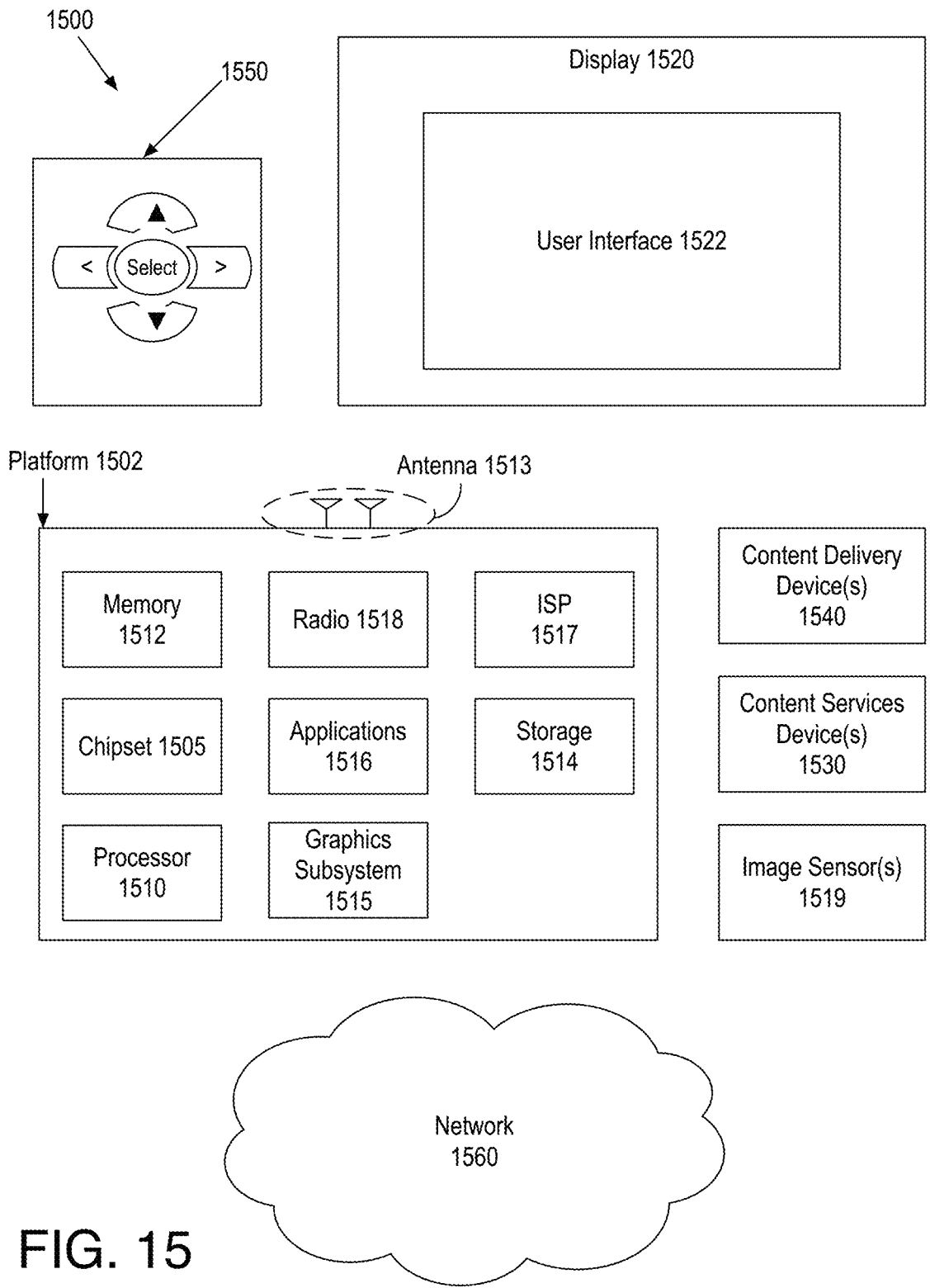
FIG. 15 is an illustrative diagram of an example system.

FIG. 15 is an illustrative diagram of an example system 1500, arranged in accordance with at least some implementations of the present disclosure. In various implementations, system 1500 may be a mobile device system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1500 includes a platform 1502 coupled to a display 1520. Platform 1502 may receive content from a content device such as content services device(s) 1530 or content delivery device(s) 1540 or other content sources such as image sensors 1519. For example, platform 1502 may receive image data as discussed herein from image sensors 1519 or any other content source. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516, image signal processor 1517 and/or radio 1518. Chipset 1505 may provide intercommunication among processor 1510, memory 1512, storage 1514, graphics subsystem 1515, applications 1516, image signal processor 1517 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Image signal processor 1517 may be implemented as a specialized digital signal processor or the like used for image processing. In some examples, image signal processor 1517 may be implemented based on a single instruction multiple data or multiple instruction multiple data architecture or the like. In some examples, image signal processor 1517 may be characterized as a media processor. As discussed herein, image signal processor 1517 may be implemented based on a system on a chip architecture and/or based on a multi-core architecture.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

Image sensors 1519 may include any suitable image sensors that may provide image data based on a scene. For example, image sensors 1519 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1519 may include any device that may detect information of a scene to generate image data.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
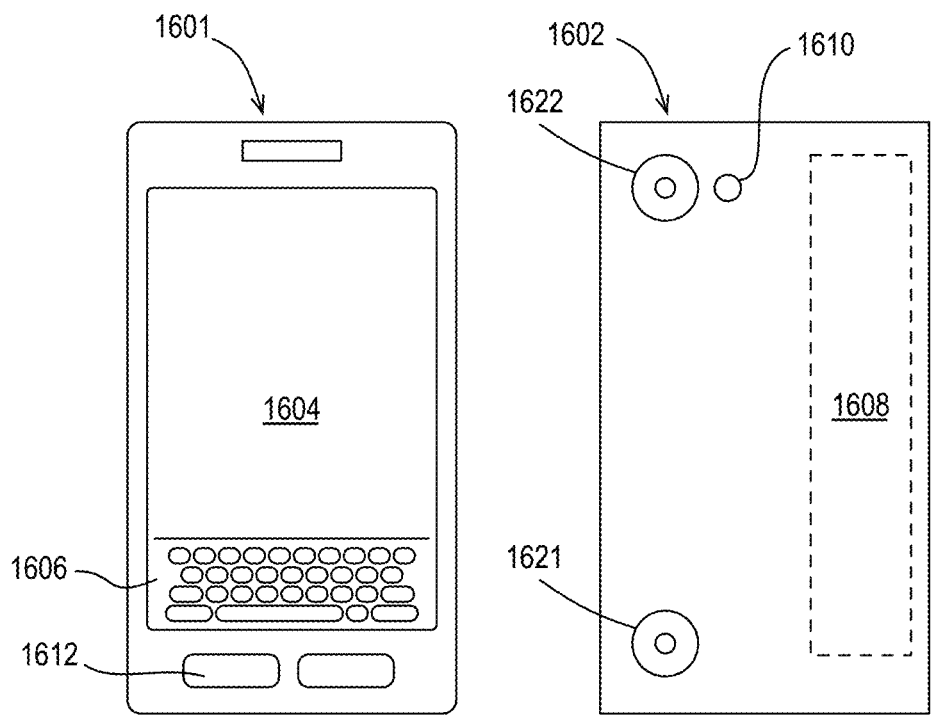
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems, components, or modules discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, a color camera 1621, a color camera 1622, and an integrated antenna 1608. In some embodiments, color camera 1621 and color camera 1622 attain planar images as discussed herein. In some embodiments, device 1600 does not include color camera 1621 and 1622 and device 1600 attains input image data (e.g., any input image data discussed herein) from another device. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include color cameras 1621, 1622, and a flash 1610 integrated into back 1602 (or elsewhere) of device 1600. In other examples, color cameras 1621, 1622, and flash 1610 may be integrated into front 1601 of device 1600 or both front and back sets of cameras may be provided. Color cameras 1621, 1622 and a flash 1610 may be components of a camera module to originate color image data with IR texture correction that may be processed into an image or streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a super resolution image comprises receiving a low resolution image comprising an entirety of at least one person, generating a first super resolution image using the low resolution image, wherein the first super resolution image has a greater resolution than the low resolution image, applying a first pretrained convolutional neural network to the first super resolution image to associate particular labels from a predetermined set of labels to pixels of the first super resolution image, wherein the predetermined set of labels comprise at least a set of labels each corresponding to at least a part of clothing or a body part of the at least one person, determining pose information corresponding to the at least one person using the first super resolution image, concatenating a plurality of image channels comprising at least one image channel corresponding to each of: the first super resolution image, a label of the predetermined set of labels, and the pose information to generate a stacked image, generating a second super resolution image by applying a second pretrained convolutional neural network to the stacked image, and generating an image for presentment to a viewer using the second super resolution image.

In one or more second embodiments, further to the first embodiments, the set of labels comprise first labels each corresponding to a part of a predetermined uniform worn by the at least one person and second labels each corresponding to a predetermined uniformly exposed body part corresponding to the predetermined uniform.

In one or more third embodiments, further to the first or second embodiments, the plurality of image channels of the stacked image comprise a channel for each color channel of the first super resolution image, a channel for each of the predetermined set of labels, and a channel for each full body part identified by the pose information.

In one or more fourth embodiments, further to the first through third embodiments, each channel for each of the predetermined set of labels comprises a binary image having a first value for pixels associated with each of the predetermined set of labels and a second value for pixels not associated with each of the predetermined set of labels.

In one or more fifth embodiments, further to the first through fourth embodiments, each channel for each full body part identified by the pose information comprises a probability map having probability values for pixels thereof, each probability value indicating a probability the pixel is associated with each full body part identified by the pose information.

In one or more sixth embodiments, further to the first through fifth embodiments, generating the first super resolution image comprises applying a third pretrained convolutional neural network to the low resolution image.

In one or more seventh embodiments, further to the first through sixth embodiments, the first, second, and third convolutional neural networks are pretrained in an end-to-end manner based on a training set of images comprising entireties of persons wearing predetermined uniforms.

In one or more eighth embodiments, further to the first through seventh embodiments, the method further comprises detecting one of an identify of the at least one person or a particular feature of the at least one person using the low resolution image or the first super resolution image, attaining, from memory, a predetermined image patch using the identify or the particular feature, generating a sub-image from the predefined image patch, and merging the second super resolution image and the sub-image, wherein generating the image for presentment is based on the merged image.

In one or more ninth embodiments, further to the first through eighth embodiments, generating the sub-image comprises projecting the predefined image patch to an image plane defined by relative positions of a camera used to attain the low resolution image and the at least one person to generate a projected image patch.

In one or more tenth embodiments, further to the first through ninth embodiments, generating the sub-image comprises concatenating the channel corresponding to the first super resolution image, the channel corresponding to the label of the predetermined set of labels, and the projected image patch to generate a second stacked image and applying a third pretrained convolutional neural network to the second stacked image to generate the sub-image, wherein the third pretrained convolutional neural network is pretrained separately from the first and second pretrained convolutional neural networks using a training image set including predetermined lighting conditions of a predetermined scene corresponding to the predetermined uniform.

In one or more eleventh embodiments, further to the first through tenth embodiments, the clothing comprises a predetermined uniform comprises a particular sports uniform, the least one person is in a sporting scene corresponding to the particular sports uniform, and the low resolution image is a portion of a full attained from one of a plurality of cameras each recording images of the scene at a resolution of not less than 4 k resolution.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments. For In some embodiments, the at least one machine readable medium is a non-transitory machine readable medium.

In one or more fourteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus comprising:
a memory to store at least a portion of a low resolution image comprising at least one person; and
one or more processors coupled to the memory, the one or more processors to:
generate a first super resolution image using the low resolution image, wherein the first super resolution image has a greater resolution than the low resolution image;
concatenate a plurality of image channels to generate a stacked image, the image channels comprising at least one image channel corresponding to each of: the first super resolution image, labels associated with the first super resolution image, wherein the labels are from a predetermined set of labels corresponding to at least a part of clothing or a body part, and pose information corresponding to the at least one person; and generate a second super resolution image by application of a pretrained convolutional neural network to the stacked image.

2. The apparatus of claim 1, wherein the set of labels comprises first labels each corresponding to a part of a predetermined uniform worn by the at least one person and second labels each corresponding to a predetermined uniformly exposed body part corresponding to the predetermined uniform.

3. The apparatus of claim 1, wherein the plurality of image channels of the stacked image comprise a channel for each color channel of the first super resolution image, a channel for each of the predetermined set of labels, and a channel for each body part identified by the pose information.

4. The apparatus of claim 3, wherein each channel for each of the predetermined set of labels comprises a binary image having a first value for pixels associated with each of the predetermined set of labels and a second value for pixels not associated with each of the predetermined set of labels.

5. The apparatus of claim 4, wherein each channel for each body part identified by the pose information comprises a probability map having probability values for pixels thereof, each probability value indicating a probability the pixel is associated with each body part identified by the pose information.

6. The apparatus of claim 1, wherein the one or more processors to generate the first super resolution image comprises the one or more processors to apply a second pretrained convolutional neural network to the low resolution image, the one or more processors further to apply a third pretrained convolutional neural network to the first super resolution image to generate the labels associated with the first super resolution image.

7. The apparatus of claim 6, wherein the pretrained convolutional neural network, second convolutional neural network, and third convolutional neural network are pretrained in an end-to-end manner based on a training set of images comprising persons wearing predetermined uniforms.

8. At least one non-transitory machine readable medium comprising a plurality of instructions that, in response to being executed on a computing device, cause the computing device to:

receive a low resolution image comprising at least one person;

generate a first super resolution image using the low resolution image, wherein the first super resolution image has a greater resolution than the low resolution image;

concatenate a plurality of image channels to generate a stacked image, the image channels comprising at least one image channel corresponding to each of: the first super resolution image, labels associated with the first super resolution image, wherein the labels are from a predetermined set of labels corresponding to at least a part of clothing or a body part, and pose information corresponding to the at least one person; and generate a second super resolution image by application of a pretrained convolutional neural network to the stacked image.

9. The non-transitory machine readable medium of claim 8, wherein the set of labels comprises first labels each corresponding to a part of a predetermined uniform worn by the at least one person and second labels each corresponding to a predetermined uniformly exposed body part corresponding to the predetermined uniform.

10. The non-transitory machine readable medium of claim 8, wherein the plurality of image channels of the stacked image comprise a channel for each color channel of the first super resolution image, a channel for each of the predetermined set of labels, and a channel for each body part identified by the pose information.

11. The non-transitory machine readable medium of claim 8, wherein the instructions to generate the first super resolution image comprises instructions to apply a second pretrained convolutional neural network to the low resolution image, the instructions further comprising instructions to apply a third pretrained convolutional neural network to the first super resolution image to generate the labels associated with the first super resolution image.

12. An apparatus comprising:
a memory to store at least a portion of a low resolution image comprising at least one person; and
one or more processors coupled to the memory, the one or more processors to:
generate a first super resolution image based on application of a convolutional neural network to a stacked image, the stacked image comprising a plurality of image channels, the image channels comprising a second super resolution image corresponding to the low resolution image, clothing or body part labels associated with the second super resolution image, and pose information corresponding to the at least one person;
detect one of an identity of the at least one person or a particular feature of the at least one person using the low resolution image or the second super resolution image;
attain a predetermined image patch using the identity or the particular feature;
generate a sub-image from the predetermined image patch; and
merge the first super resolution image and the sub-image to generate a resultant super resolution image.

13. The apparatus of claim 12, wherein the one or more processors to generate the sub-image comprises the one or more processors to:
project the predetermined image patch to an image plane defined by relative positions of a camera used to attain the low resolution image and the at least one person to generate a projected image patch.

14. The apparatus of claim 13, wherein the one or more processors to generate the sub-image further comprises the one or more processors to:
concatenate the channel corresponding to the first super resolution image, the channel corresponding to the label of the predetermined set of labels, and the projected image patch to generate a second stacked image;
apply a second pretrained convolutional neural network to the second stacked image to generate the sub-image.

15. The apparatus of claim 14, wherein the second pretrained convolutional neural network is pretrained separately from the pretrained convolutional neural network using a training image set including predetermined lighting conditions of a predetermined scene.

16. The apparatus of claim 12, wherein the plurality of image channels of the stacked image comprise a channel for each color channel of the second super resolution image, a channel for each of the clothing or body part labels, and a channel for each body part identified by the pose information.

17. At least one non-transitory machine readable medium comprising a plurality of instructions that, in response to being executed on a computing device, cause the computing device to:
receive a low resolution image comprising at least one person;
generate a first super resolution image based on application of a convolutional neural network to a stacked image, the stacked image comprising a plurality of image channels, the image channels comprising a second super resolution image corresponding to the low resolution image, clothing or body part labels associated with the second super resolution image, and pose information corresponding to the at least one person;
detect one of an identity of the at least one person or a particular feature of the at least one person using the low resolution image or the second super resolution image;
attain a predetermined image patch using the identity or the particular feature;
generate a sub-image from the predetermined image patch; and
merge the first super resolution image and the sub-image to generate a resultant super resolution image.

18. The non-transitory machine readable medium of claim 17, wherein the instructions to generate the sub-image comprise instructions to:
project the predetermined image patch to an image plane defined by relative positions of a camera used to attain the low resolution image and the at least one person to generate a projected image patch.

19. The non-transitory machine readable medium of claim 18, wherein the instructions to generate the sub-image further comprise instructions to:
concatenate the channel corresponding to the first super resolution image, the channel corresponding to the label of the predetermined set of labels, and the projected image patch to generate a second stacked image;
apply a second pretrained convolutional neural network to the second stacked image to generate the sub-image.

20. The non-transitory machine readable medium of claim 19, wherein the second pretrained convolutional neural network is pretrained separately from the pretrained convolutional neural network using a training image set including predetermined lighting conditions of a predetermined scene.

* * * * *